(12) United States Patent
Yamato et al.

(10) Patent No.: US 6,345,122 B1
(45) Date of Patent: Feb. 5, 2002

(54) COMPRESSED PICTURE DATA EDITING APPARATUS AND METHOD

(75) Inventors: Atsushi Yamato, Chiba; Katsumi Tahara; Mikita Yasuda, both of Kanagawa; Shinji Negishi, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/231,055

(22) Filed: Jan. 14, 1999

(30) Foreign Application Priority Data

Jan. 19, 1998 (JP) .............................. 10-008032

(51) Int. Cl.[7] .............................. G06K 9/46; H04N 9/74; H04N 7/10; H04J 1/00
(52) U.S. Cl. ...................... 382/232; 348/584; 370/487; 725/32
(58) Field of Search ................................ 382/232, 236; 348/584, 578, 571; 370/487, 486, 498; 725/32, 109, 119

(56) References Cited

U.S. PATENT DOCUMENTS

| 5,534,944 A | * | 7/1996 | Egawa et al. | 348/584 |
|---|---|---|---|---|
| 5,859,660 A | * | 1/1999 | Perkins et al. | 725/32 |
| 5,917,830 A | * | 6/1999 | Chen et al. | 370/487 |
| 6,154,496 A | * | 11/2000 | Radha | 375/240.28 |
| 6,188,700 B1 | * | 2/2001 | Kato et al. | 370/477 |

FOREIGN PATENT DOCUMENTS

| JP | 409284762 | * 10/1997 | ............ H04N/7/24 |

OTHER PUBLICATIONS

"Compressed video seamless switching using variable splicing parameters," Radha, H. et al., Image Processing, ICIP 98 Proceedings, vol. 1, 1998, pp. 862–865.*

"Rate and buffer regulation in a video encoder for seamless splicing," Balakrishnan, M. et al., Image Processing, ICIP 98 Proceedings, vol. 1, 1998, pp. 880–883.*

ITU–T Recommendation H. 222.0, IEC 13818–1, Information technology—Generic coding of moving pictures and associated audio information: System, ISO/IEC JTC 1/SC 29, Apr. 27, 1995, pp. 135–138 (Annex L—Splicing Transport Streams).*

* cited by examiner

*Primary Examiner*—Wenpeng Chen
(74) *Attorney, Agent, or Firm*—Frommer Lawrence & Haug LLP; William S. Frommer; Gordon Kessler

(57) ABSTRACT

An editing apparatus and the like are provided for splicing two data streams of compressed picture data at an arbitrary splice point without breaking down the VBV buffer. The editing apparatus inserts between a main stream and a sub-stream compressed by the MPEG-2/Video Method an inserted stream of which a first picture is a black I picture and succeeding pictures are repeat P pictures of which all macro blocks are skipped macro blocks. In this inserted stream, a VBV delay of a picture to be transmitted next, after a last picture in the main stream, is written as a VBV delay of a first picture in the main stream into the picture header. Further, a stuffing byte of which the data amount is calculated based on the bit occupancy in the VBV buffer by the sub-stream at an arbitrary splice point is transmitted along with the last picture in the inserted stream.

51 Claims, 17 Drawing Sheets

COMPRESSED PICTURE DATA EDITING APPARATUS AND METHOD

BACKGROUND OF THE INVENTION

The present invention relates generally to a compressed picture data editing apparatus and method and recording medium for storing instructions to perform such editing and to store such edited data, and more particularly to a compressed picture data editing apparatus and method in which two compressed picture data streams are spliced to each other at an arbitrary splice point to generate one continuous compressed picture data stream, and a recording medium on which the continuous compressed picture data stream is stored.

Recently, digital transmission systems for moving pictures such as a digital broadcasting system, a visual telephone system, etc. have been developed. In such digital transmission systems in general, moving picture data is compressed according to the MPEG-2/Video method. MPEG is an abbreviation for the "Moving Picture coding Experts Group" of the ISO/IEC JTC1/SC29 (International Organization for Standardization/International Electrotechnical Commission, Joint Technical Committee 1/Sub Committee 29). An ISO 11172 standard is provided for an MPEG Phase 1, and an ISO 13818 standard is provided for an MPEG Phase 2. In these international standards, ISO 11172-1 and 13818-1 are provided for system multiplexing, ISO 11172-2 and 13818-2 are provided for video coding, and ISO 11172-3 and 13818-3 are provided for audio coding.

According to the MPEG-2/Video standard (ISO 13818-2), when decoding a compressed picture data input, in order to prevent an input buffer located at the front part of a decode circuit from underflowing or overflowing, the capacity of the input buffer should be considered, and the amount of compression during encoding should be controlled so that upon decoding the input buffer can accommodate the supplied data amount without underflowing or overflowing. When encoding according to the MPEG-2/Video standard, a virtual buffer for monitoring and controlling the amount of code that would be generated during decoding is defined as a VBV (Video Buffering Verifier) buffer, and the capacity of this VBV buffer is defined as VBV buffer size (vbv_buffer_size). The function of the VBV buffer will be further described with reference to FIG. 14, which depicts the amount of data stored in an input buffer provided upstream of a decode circuit when the buffer is supplied with input MPEG streams. The horizontal axis of FIG. 14 represents time along which decoding times ($t_{101}$, $t_{102}$, $t_{103}$, . . . ) for various pictures are shown while the vertical axis represents the amount of data (bit occupancy) stored in the input buffer. The input buffer will store the MPEG streams compressed according to the MPEG-2/Video Method sequentially at their respective bit rates.

During a decoding procedure, the data corresponding to a first picture is extracted from the VBV buffer by the decoder at a time $t_{101}$. This time $t_{101}$ includes a delay (vbv_delay) from a time $t_{100}$, the time at which the supply of the picture data is started, to allow for the data amount stored in the input buffer to reach an initial predetermined amount so that all of the data associated with the first few pictures can be loaded into the VBV buffer. Data representing the length of the delay (vbv_delay) is included as part of the MPEG stream in a picture layer. The time is represented by a clock of 90 kHz, for example.

During decoding, the amount of data corresponding to a picture to be extracted from the VBV buffer by the decode circuit to be decoded is the sum of the amount of data comprising the picture (picture_size), the amount of data comprising a picture start code (picture_start_code), and the amount of data comprising a sequence header (sequence_header). The amount of data resulting from the addition of picture_size, picture_start_code and sequence_header will be referred to as "image size (image_size)".

After time $t_{101}$ and the extraction of the data of the first image to be decoded from the VBV buffer, the input buffer will be sequentially supplied with a succession of MPEG data streams at a predetermined bit rate corresponding to subsequent transmitted pictures. Also decoding of sequential pictures takes place at times $t_{102}$, $t_{103}$, . . . , $t_n$, $t_{n+1}$, . . . , $\Delta DTS$ being a time interval between decode procedures. At each time $t_{102}$, $t_{103}$, . . . , $t_n$, $t_{n+1}$, . . . , an amount of data corresponding to the image size of each picture is extracted by the decode circuit from the VBV buffer for decoding. Thus, the input buffer provided upstream of the decode circuit will store the MPEG streams received sequentially at their respective bit rates while an amount of data corresponding to image size of each picture is extracted by the decode circuit at each of the decoding times ($t_{101}$, $t_{102}$, $t_{103}$, . . . ).

If the total amount of data of the supplied MPEG streams exceeds the total amount of data corresponding to the image sizes of the pictures extracted from the VBV buffer at the decoding times, that is more data is added to the VBV buffer than is removed from it, the input buffer will eventually overflow when this excess data exceeds the size of the VBV buffer. If the total amount of data of the image sizes of the pictures extracted for decoding exceeds the total amount of data of the supplied MPEG streams, that is less data is added to the VBV buffer than is removed from it, the input buffer will underflow because more data will be taken out of the VBV buffer than will be input to it. To avoid overflowing or underflowing the VBV buffer, the MPEG-2/Video (ISO 13818-2) standard prescribes that when encoding MPEG streams, the capacity of an input buffer provided upstream of a decode circuit during decoding should be modeled as a VBV buffer size (vbv_buffer_size) to allow for control of the amount of encoded data produced during encoding. The model input buffer is thus designed to accommodate an appropriate amount of data during encoding so that during decoding, the amount of data contained in the VBV buffer will remain within a predetermined range.

Generally, at a broadcasting station or the like, in order to transmit a moving picture sequence that has been compressed according to the MPEG-2 system, often two or more sets of moving picture data are edited and spliced together to form one set of moving picture data. For example, at the broadcasting station, moving picture data of a movie may be edited to insert a commercial into the movie as shown in FIG. 15. Each of the commercials includes an amount of data that allows the commercial to run for a short period of time. When conventionally performing such an edit, for real-time transmission and for convenience in editing, baseband moving picture data are not handled during editing. Rather, compressed MPEG streams are processed during editing without decoding.

First to third conventional alternatives for performing such editing will now be described. In each of the conventional alternatives, a first picture data stream compressed according to the MPEG-2/Video Method ("main stream" hereinafter) has spliced thereto a second picture data stream also compressed according to the MPEG-2/Video Method ("sub-stream" hereinafter) to generate one spliced data stream. The conventional first to third alternatives will be described with reference to FIGS. 16 to 18, which show the amount of data in the VBV buffer attributable to the main stream, the amount of data in the VBV buffer attributable to the sub-stream, and the amount of data in the VBV buffer attributable to the spliced stream, respectively.

First, referring to FIG. 16, the conventional first alternative will be described. As is shown in FIG. 16A, a splice-out point at which the main stream is to be spliced out is defined at as a time ($t_{111}$). At this splice-out point, the supply of data to the VBV buffer from the main stream will end. In the first conventional alternative, a splice-in point of the sub-stream is defined at a time ($t_{121}$). At this splice-in point the supply of the sub-stream to the VBV buffer will start, as shown in FIG. 16B. According to the first conventional alternative, the splice-out and splice-in points of the main stream and sub-stream, respectively, are spliced to each other at the time $t_{111}$ so that the picture in the main stream is extracted by a decode circuit until a time $t_{112}$ and the picture in the sub-stream is extracted by the decode circuit after the time $t_{112}$ to generate one spliced stream, as shown in FIG. 16C, for example. In the case of the spliced stream thus generated according to the first conventional alternative, however, the difference between the total data amount of the supplied picture and the total data amount of the extracted picture may exceed the VBV buffer size so that the VBV buffer will possibly overflow as indicated at the hatched portion in FIG. 16C.

Next, the second conventional alternative will be described, making reference to FIG. 17. As is shown in FIG. 17A, a splice-out point of the main stream is defined at a time ($t_{131}$) at which the last picture from the mainstream will be extracted by the decode circuit. In this second conventional alternative, a splice-in point of the sub-stream is defined at a time ($t_{141}$) at which time the amount of data contained in the VBV buffer will be the same as the amount of data contained in the VBV buffer at the splice-out point of the main stream, as shown in FIG. 17B. In the second conventional alternative, the splice points of the main stream and sub-stream, respectively, are spliced to each other at the time $t_{131}$ so that the data associated with the picture of the main stream is extracted from the buffer by a decode circuit until a time $t_{131}$, and thereafter the data associated with the picture in the sub-stream is extracted by the decode circuit to generate one spliced stream, as shown in FIG. 17C, for example. In this second conventional alternative, however, since the first picture in the sub-stream is extracted at a time at which a next picture would have been extracted from the main stream, if provided (next_vbv_delay), the total data amount of the extracted picture data from the VBV buffer may be larger than the total amount of data that has been supplied to the VBV buffer as shown in FIG. 17C. The VBV buffer may underflow. More particularly, since the VBV delay of the next picture after the last picture to be extracted from the main stream (next_vbv_delay) is shorter than the delay of the first picture to be extracted from the sub-stream (first_vbv_delay), the VBV buffer may underflow.

Finally, the third conventional alternative will now be described with reference to FIG. 18. As shown in FIG. 18A, a splice-out point of the main stream is taken as a time ($t_{151}$) at which a last picture will be extracted from the VBV buffer by the decode circuit and the amount of data in the VBV buffer is zero. In this third conventional alternative, a splice-in point of the sub-stream is taken as a time ($t_{161}$) at which time the supply of the sub-stream data to the VBV buffer will start, as shown in FIG. 18B. The splice points of the main stream and sub-stream are spliced to each other at the time $t_{151}$ so that the picture supplied from the main stream is extracted from the VBV buffer by a decode circuit until a time $t_{151}$. Thereafter, the picture supplied from the sub-stream is extracted by the decode circuit after the time $t_{152}$ to generate one spliced stream, as seen from FIG. 18C, for example. In this third conventional alternative, since the supply of the sub-stream data starts after the last picture supplied by the main stream has been extracted from the VBV buffer, the VBV buffer will not overflow or underflow. However, there is a time zone (between $t_{151}$ and $t_{152}$) in which the decode circuit cannot extract any picture from the VBV buffer. Similarly, no data is supplied to the VBV buffer from the time ($t_{150}$) at which the last picture from the main stream data is supplied until the time ($t_{151}$) at which the supply of the sub-stream data starts. Therefore, the third conventional alternative does not allow for continuous provision of MPEG stream data to the decoder. The decoder is unable to properly process the MPEG stream, and as a result does not allow for stable decoding of MPEG picture data.

Therefore, it would be beneficial to provide an editing apparatus and method that overcome the drawbacks of the prior art.

OBJECTS OF THE INVENTION

Accordingly, it is an object of the invention to provide an improved editing apparatus and method that overcomes the above-mentioned drawbacks of the prior art.

Another object of the invention is to provide an improved compressed picture data editing apparatus and method adapted to generate one continuous compressed picture data stream by splicing two data streams of compressed picture data to each other at an arbitrary splice point in such a manner that an input buffer of a decoder will not overflow, underflow, or otherwise break down and in which the decoder is not constrained in its ability to process the spliced data stream.

A further object of the invention is to provide a recording medium for storing a continuous compressed picture data stream generated according to the invention.

Still other objects and advantages of the invention will in part be obvious and will in part be apparent from the specification and the drawings.

SUMMARY OF THE INVENTION

In accordance with the invention, a compressed picture data editing apparatus is provided for generating a continuous compressed picture data by splicing an arbitrary splice point of a first compressed picture data stream (first elementary stream) and an arbitrary splice point of a second compressed picture data stream (second elementary stream). The first and second elementary streams are spliced by inserting between the arbitrary splice point of the first elementary stream and the splice point of the second elementary stream a compressed picture data inserted stream including a predetermined compressed picture data and a pseudo data. A bit occupancy in a virtual buffer is determined for the first elementary stream at the arbitrary splice point, which controls an amount of code generation during encoding. A bit occupancy is also determined in the virtual buffer for the second elementary stream at the arbitrary splice point, and for an elementary inserted stream. The splicer is controlled based on the detected bit occupancies and the amount of compressed picture data in the elementary inserted stream and the amount of required pseudo data to make the bit occupancy of the elementary inserted stream in the first virtual buffer equal to the amount of compressed picture data in the first elementary stream in the virtual buffer at the arbitrary splice point. Additionally, the bit occupancy in the virtual buffer determined by the amount of compressed picture data in the elementary inserted stream is made to coincide with that in the second elementary stream in the virtual buffer at the arbitrary splice point.

As a feature of the present invention, the bit occupancy in the first virtual buffer for an elementary inserted stream is made to coincide with the bit occupancy in the first virtual buffer for the first elementary stream at the arbitrary splice point. The bit occupancy in the last virtual buffer attributable to the elementary inserted stream is similarly made to coincide with the bit occupancy in the virtual buffer for the second elementary stream at the arbitrary splice point. The elementary stream is inserted between the first and second elementary streams to generate a continuous compressed picture data stream.

As another feature of the present invention, when the bit occupancy in the virtual buffer by the elementary inserted stream exceeds the size of the virtual buffer, a pseudo data larger than the excess data for which the bit occupancy exceeds the virtual buffer size, is inserted between the first and second elementary streams so that the actual buffer utilized during decoding will not overflow.

According to the present invention, the compressed picture data and an elementary inserted stream, in which the pseudo data is inserted, are inserted between the first and second elementary streams to generate a continuous compressed picture data stream that will not overflow or underflow a buffer utilized during decoding.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

An editing apparatus constructed in accordance with the invention is adapted to edit an MPEG-2/Video-compressed picture data by splicing to the trailing end of an arbitrary picture in a data stream (first elementary stream) of a first picture data compressed by the MPEG-2/Video Method a data stream (second elementary stream) of a second picture data compressed by the MPEG-2/Video Method to generate a spliced stream.

Figure 1:
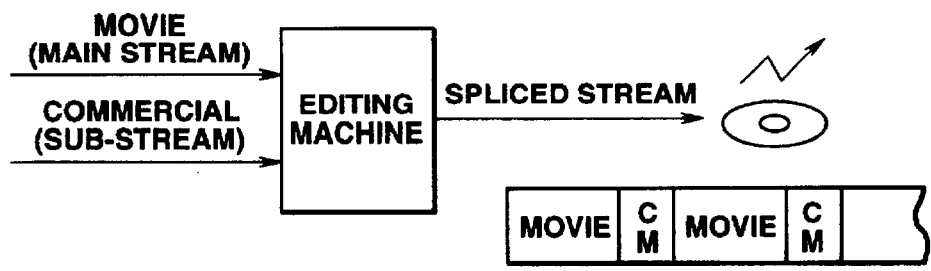
FIG. 1 depicts an editing apparatus constructed in accordance with the invention.

Referring first to FIG. 1, an editing apparatus 1 constructed in accordance with the invention is utilized, for example, for inserting in a timely manner, a second elementary stream (will be referred to as "sub-stream" hereinafter) such as commercials or the like, each of a short duration and compressed by the MPEG-2/Video Method, into a first elementary stream (will be referred to as "main data stream" hereinafter) such as a movie or the like compressed by the MPEG-2/Video Method to produce a single program data stream ("spliced stream"). The spliced stream may be recorded on a recording medium such as a disc or tape, or may alternatively be transmitted to a receiving terminal via a transmission line such as a satellite, broadcasting network, standard terrestrial wave transfer line or Internet.

Figure 2:
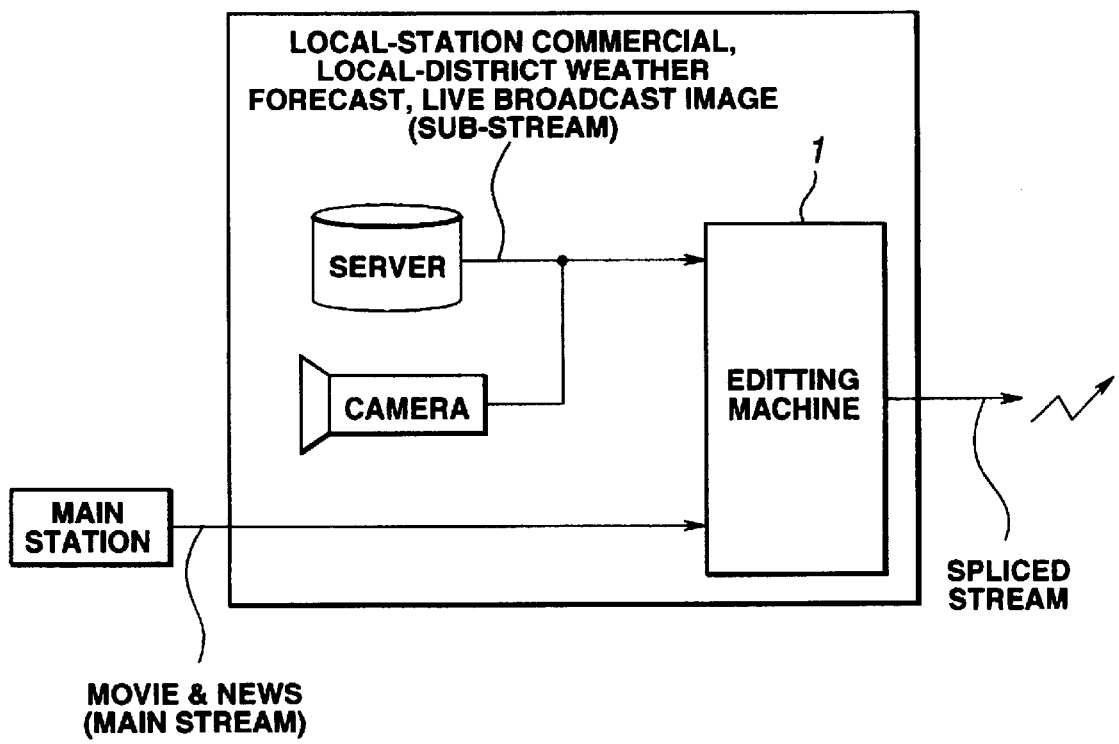
FIG. 2 depicts the editing apparatus of FIG. 1 in greater detail.

As is shown in FIG. 2, editing apparatus 1 is employed in a local broadcasting station to receive a main stream, including a movie, news or a similar program transmitted from a main, possibly remote broadcasting station. Editing apparatus 1 then generates a spliced stream or local program by inserting into the main stream of the movie or the news program a sub-stream such as a local weather-forecast, local commercial stored in a server, on-the-spot live image supplied from a live, local camera or the like, and the spliced stream is transmitted to a receiving terminal via a transmission line.

Figure 3:
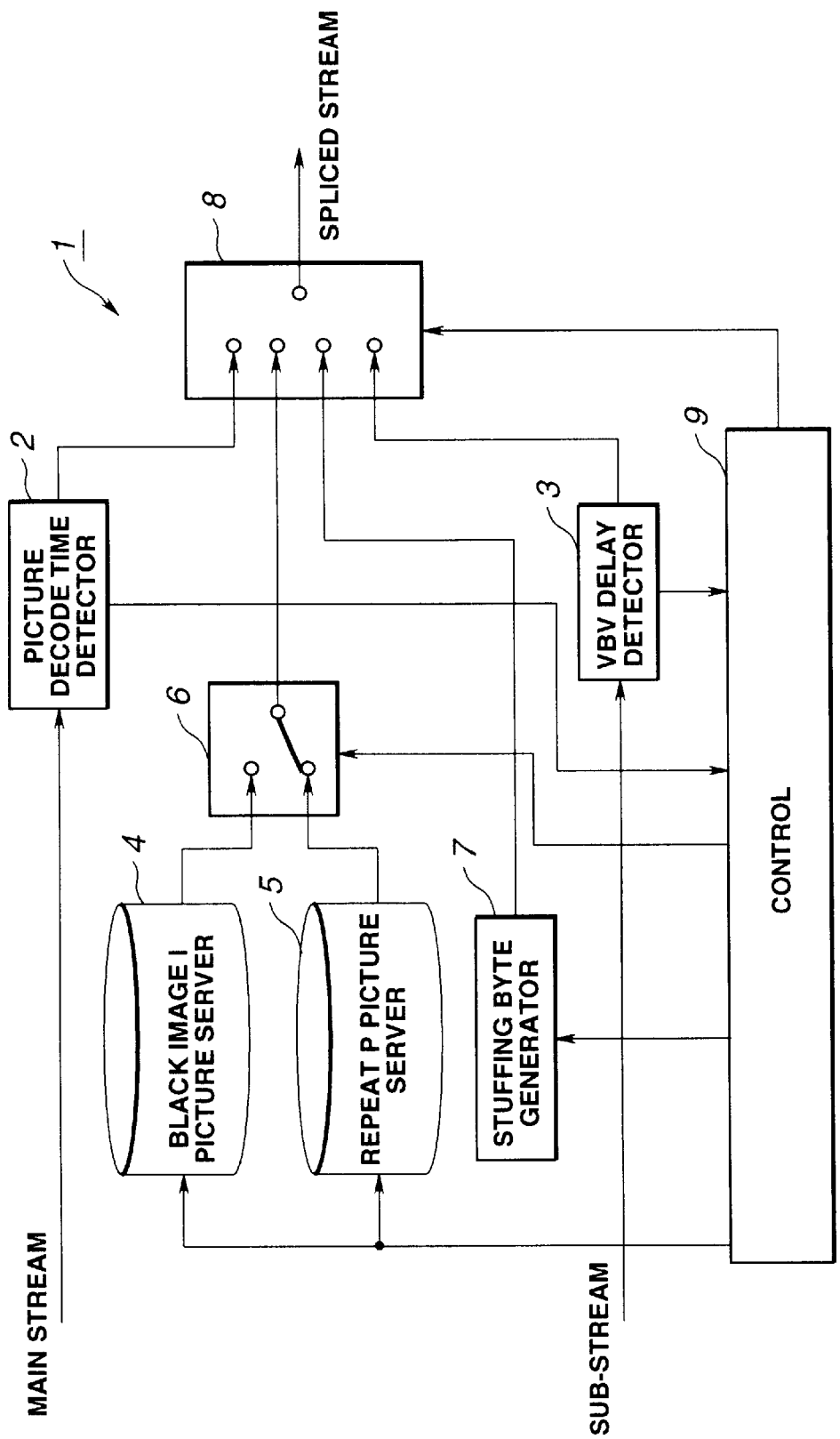
FIG. 3 is a block diagram depicting the structure of editing apparatus according to the invention.

FIG. 3 depicts a block diagram of editing apparatus 1 constructed in accordance with the invention. Editing apparatus 1 is supplied with a main data stream whose data ends at an arbitrary picture, and a sub-stream whose data starts at an arbitrary picture from a server or the like (not illustrated). Arbitrary pictures are selected by a user from the main data stream and sub-stream in accordance with the operation of editing apparatus 1 during an editing process. These arbitrary pictures include a last picture in the main data stream and a first picture in the sub-stream. A main data stream splice-out point and sub-stream splice-in point are determined based upon these user selected pictures. The main data stream and the sub-stream are spliced together at the splice points by editing apparatus 1 to generate a spliced stream.

As is shown in FIG. 3, editing apparatus 1 comprises a picture decode time detector 2 to detect a VBV delay of a picture to be transmitted next after a last picture in the main data stream, a VBV delay detector 3 to detect a VBV delay of a first picture in a sub-stream, a black I picture server 4 having stored therein black I pictures, a repeat P picture server 5 having stored therein repeat P pictures, a picture select switch 6 to select between the black I picture and the repeat P picture, a stuffing byte generator 7 to generate a stuffing byte, a multiplexer 8 to receive the main data stream, sub-stream, block I picture or repeat P picture and stuffing byte and selecting one of them to generate a spliced stream, and a controller 9 to control all of these components.

Picture decode time detector 2 is supplied with a main data stream whose data ends at an arbitrary, user selected picture, namely, at a splice-out point. Picture decode time detector 2 detects a VBV delay of a picture to be transmitted as the picture next after this last picture. That is, picture decode time detector 2 detects a VBV delay of this next picture of the sub-stream that is to be spliced to the splice-out point of the main stream. A VBV delay (next_vbv_delay) of a picture to be transmitted after a selected arbitrary predetermined picture can be determined by calculating the following relation (1), from a VBV delay (vbv_delay) of the predetermined picture, an image size (image_size) of the predetermined picture, and a bit rate (bitrate) of a data stream to be transmitted.

$$\text{next\_vbv\_delay} = \text{vbv\_delay} - (\text{image\_size}/\text{bitrate}) + \Delta DTS \quad (1)$$

Therefore, in the context of the invention, the VBV delay (next_vbv_delay) of the picture to be transmitted next to, and immediately after the last picture in the main data stream can be determined, based on the following relation (2), from a VBV delay (last_vbv_delay) of the last picture in the main data stream, an image size (image_size) of the last picture, an interval of decode time stamp ΔDTS, and a bit rate (bitrate) of the main stream:

$$\text{next\_vbv\_delay} = \text{last\_vbv\_delay} - (\text{image\_size}/\text{bitrate}) + \Delta DTS \quad (2)$$

Figure 4:
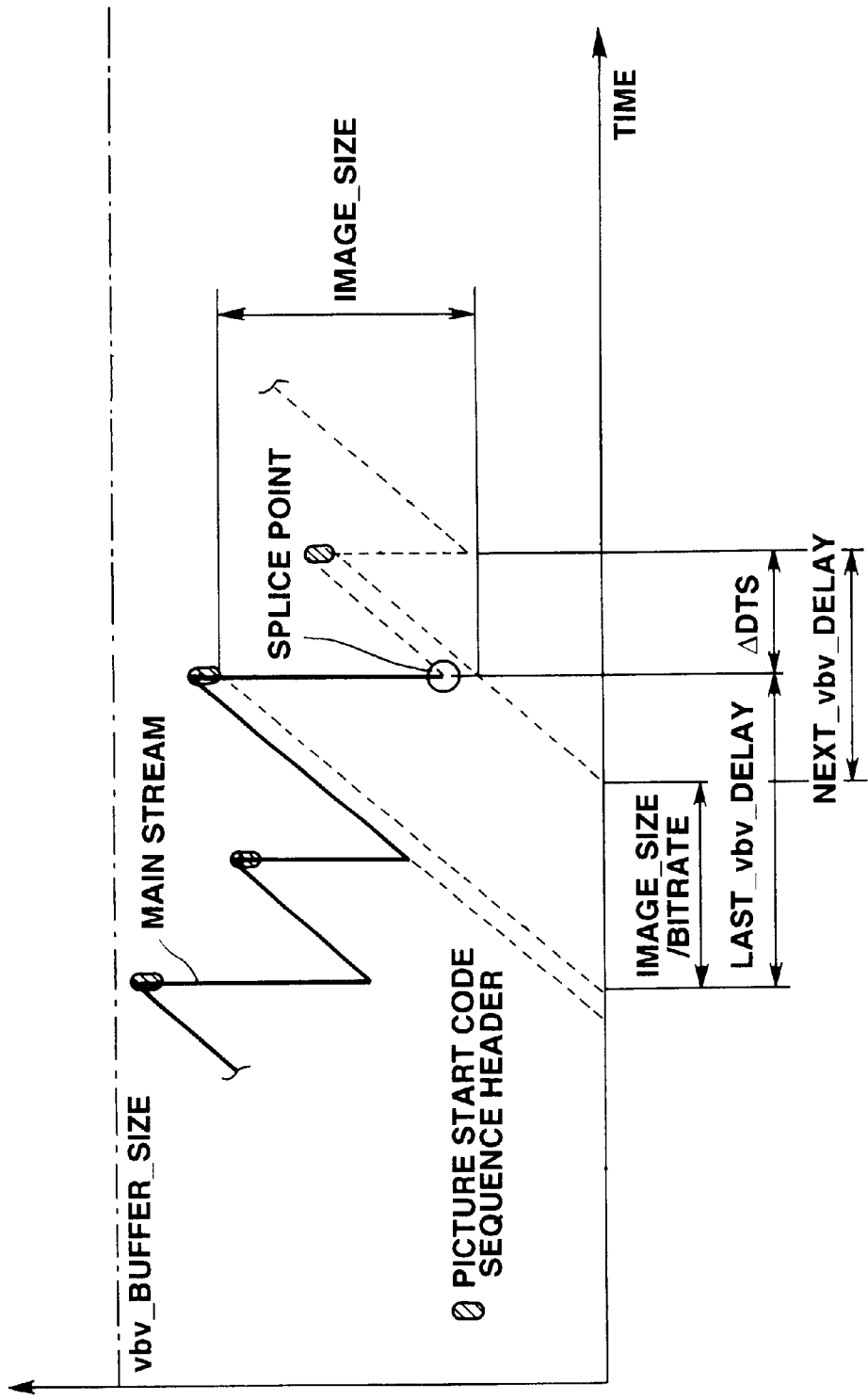
FIG. 4 shows a transition of the bit occupancy in a VBV buffer in accordance with a main stream supplied to the editing apparatus of the invention.

FIG. 4 shows the transition of the amount of data from the main data stream stored in the VBV buffer over time and also depicts the values of the parameters in relation (2). The picture decode time decoder 2 supplies the controller 9 with the VBV delay (next_vbv_delay) of a picture to be decoded next after the last picture in the main stream, having been thus determined.

Figure 5:
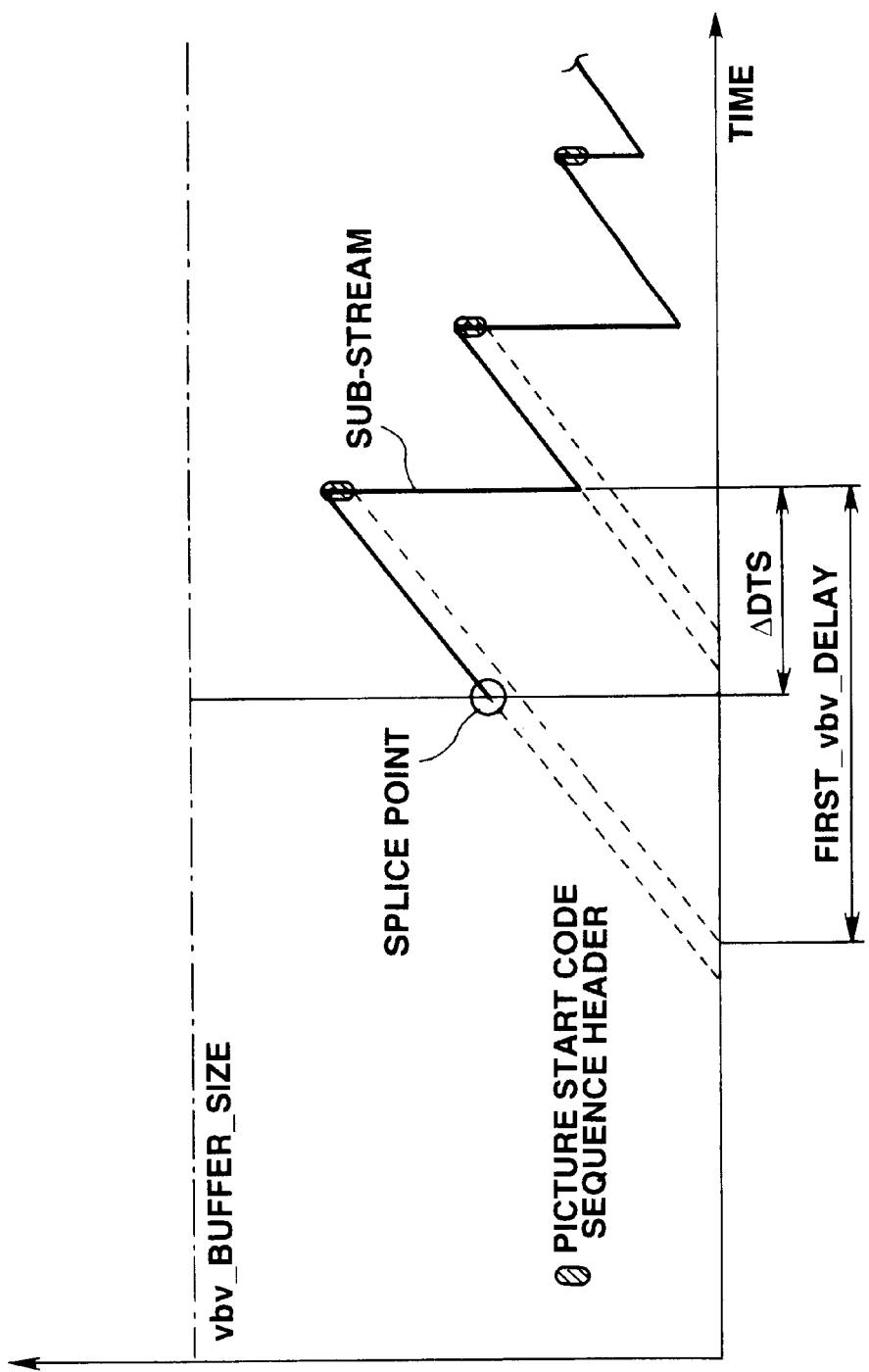
FIG. 5 shows a transition of the bit occupancy in the VBV buffer in accordance with a sub-stream supplied to the editing apparatus of the invention.

VBV delay detector 3 of FIG. 2 is supplied with a sub-stream whose data starts at an arbitrary picture. VBV delay detector 3 detects a VBV delay (first_vbv_delay) of the first picture in the sub-stream. FIG. 5 shows the transition of the amount of data from the sub-stream stored in the VBV buffer, and also the VBV delay (first_vbv_delay) of the first picture in the sub-stream. VBV delay detector 3 supplies controller 9 with the detected VBV delay (first_vbv_delay) of the first picture in the sub-stream.

Black I picture server 4 of FIG. 3 has stored therein a picture data of a black I picture and outputs the black I picture under the control of controller 9. Repeat P picture server 5 has stored therein a picture data of a P picture (will be referred to as "repeat P picture" hereinafter) of which each macro block is composed of a skipped macro block. In the MPEG-2, a macro block requiring no information and unencoded is called a skipped macro block (skipped MB). When the skipped macro block is decoded, the information in a preceding macro block will be repeated. In the repeat P picture, each macro block is composed of such a skipped macro block. Repeat P picture server 5 outputs a stored repeat P picture under the control of controller 9, thus repeating the display of the previously displayed picture. Under the control of controller 9, picture select switch 6 selects either a black I picture or a repeat P picture output from black I picture server 4 or repeat P picture server 5, respectively.

Stuffing byte generator 7 generates a stuffing byte (stuffing_byte) as a pseudo data produced when the amount of code data generated in the coding of an MPEG stream is small. The stuffing byte has no special meaning and will be discarded at the decoder. The code amount and output timing of the stuffing byte are controlled by controller 9. Controller 9 controls and monitors all the above-mentioned components of editing apparatus 1, and controls the switching of multiplexer 8 and also of picture select switch 6.

Figure 6:
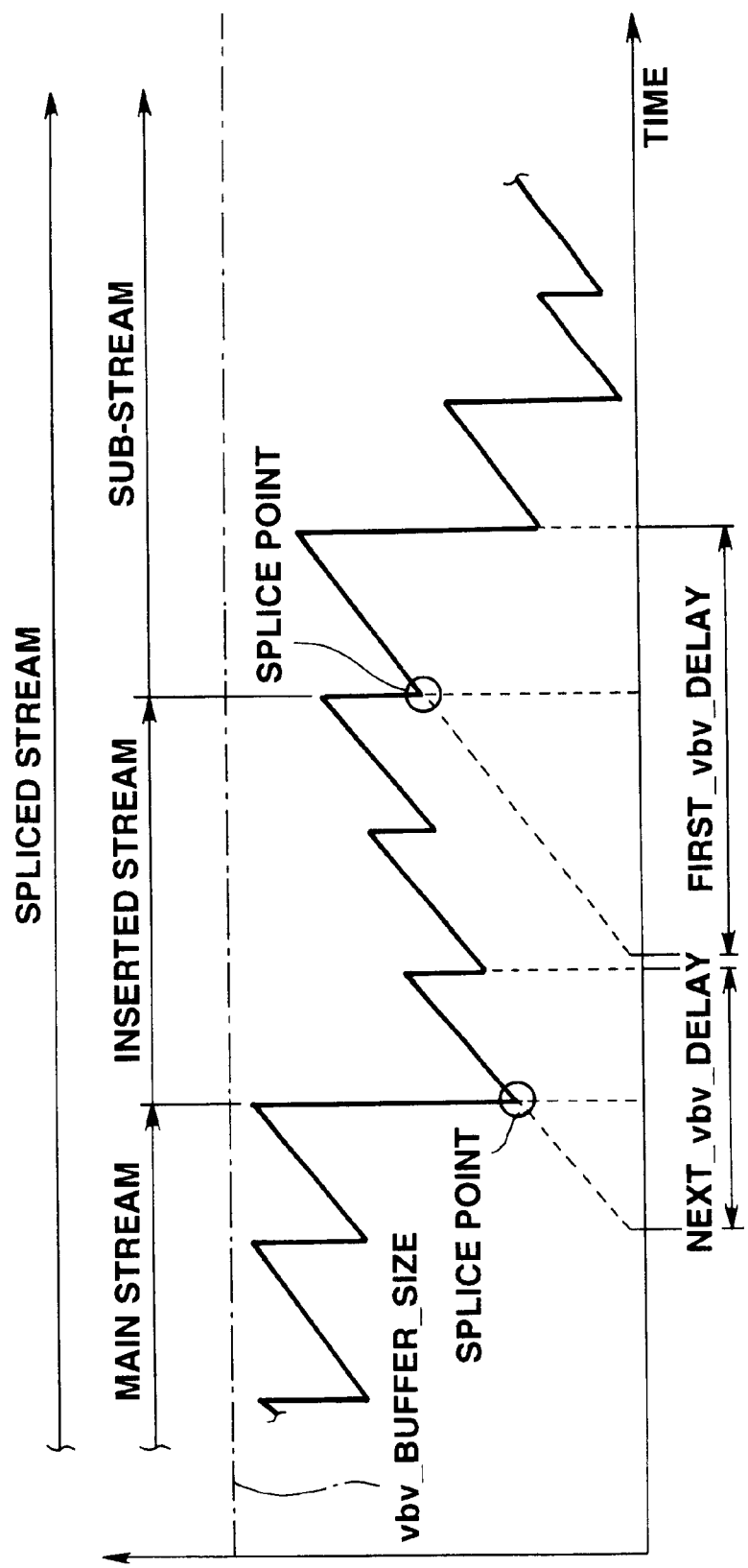
FIG. 6 shows a transition of the bit occupancy in the VBV buffer in accordance with a spliced stream generated by the editing apparatus of the invention.

Multiplexer 8 is supplied with the main data stream, sub-stream, black I picture or repeat P picture, and stuffing byte, and selects one of these inputs to generate a spliced stream under the control of controller 9. More particularly, multiplexer 8 inserts between the splice-out point of the main stream and the splice-in point of the sub-stream a data stream (will be referred to as "inserted stream" hereinafter) comprised of a compressed picture data including a black I picture, repeat P picture, stuffing byte, etc. as shown in FIG. 6.

Figure 7:
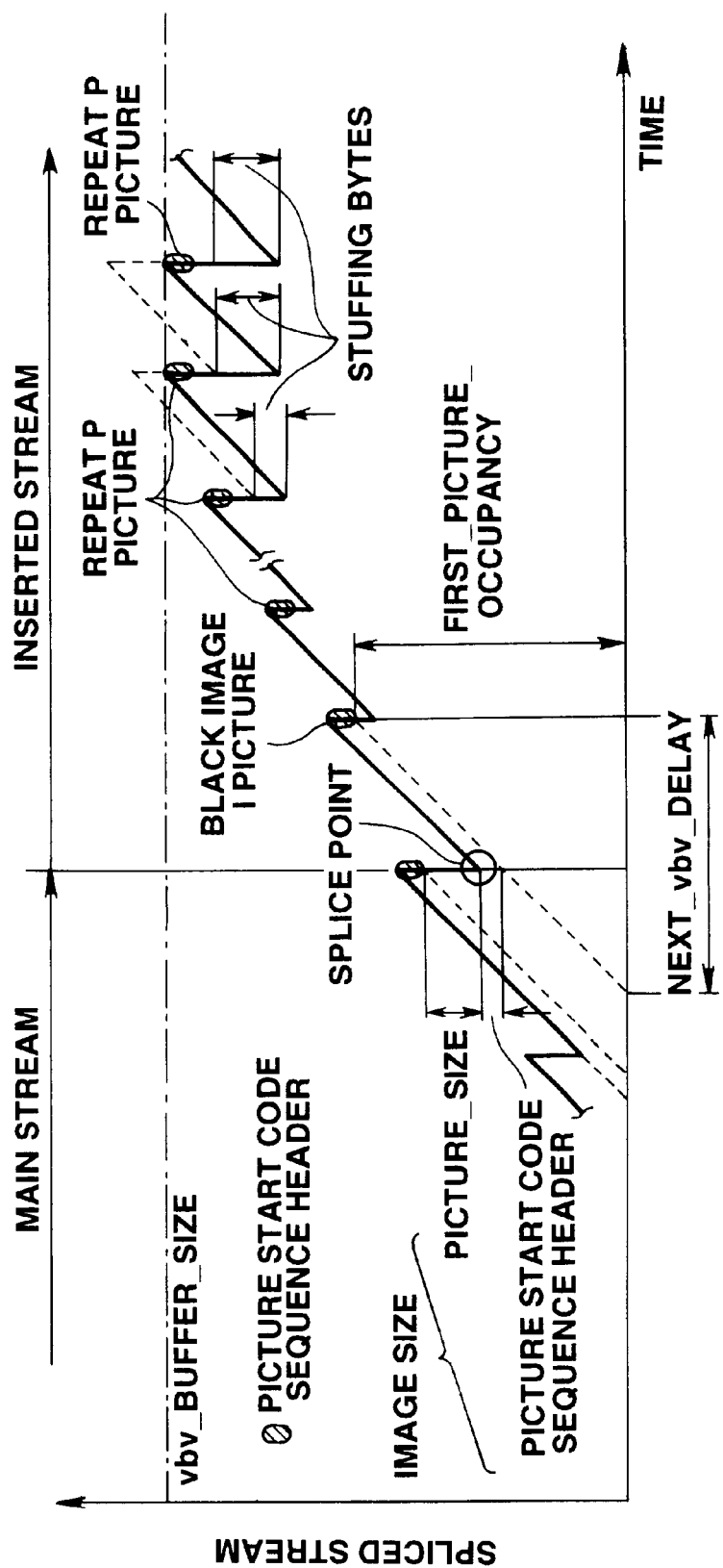
FIG. 7 shows a transition of the bit occupancy in the VBV buffer at a splice point between a main stream and a inserted stream in a spliced stream generated by the editing apparatus of the invention.

Next, the inserted stream to be inserted between the main data stream and a sub-stream will now be described. As is shown in FIG. 7, controller 9 switches multiplexer 8 upon transmission of the last picture in the main data stream, namely, the data up until the splice-out point. Thereafter, the transmission of data is continued by a transmission of a black I picture stored in black I picture server 4 as a first part of an inserted stream. At this time, the amount of data (first_picture_occupancy) of the black I picture to be stored in the VBV buffer is determined based on a VBV delay (next_vbv_delay) of a picture to be transmitted next, after the last picture in the main stream, the delay having been detected by the picture decode time detector 2, and written into the picture header.

The amount of data of each picture is determined by calculating the following relation (3):

$$\text{Amount of data} = \text{vbv\_delay} \times \text{bitrate}/\text{frequency} \quad (3)$$

where the "vbv_delay" is a VBV delay of the picture in consideration, and "frequency" is a clock frequency for indication of the VBV delay. The "frequency" is represented by the unit of 90 kHz, for example.

With the above operations, the amount of data (first_picture_occupancy) available for storing the black I picture is determined, by calculating the following relation (4), from the VBV delay (next_vbv_delay) of a picture to be decoded next, after the last picture in the main data stream, that has been detected by picture decode time detector 2.

$$\text{first\_picture\_occupancy} = \text{next\_vbv\_delay} \times \text{bitrate}/\text{frequency} \quad (4)$$

Editing apparatus 1 can splice the main data stream and inserted stream continuously by writing an amount of data of the picture to be decoded after the next to last picture in the main data stream (corresponding to the VBV delay (next_vbv_delay). This amount of data is referred to as the (first_picture_occupancy) of the first picture in the inserted stream. The spliced stream thus generated will not break down the input buffer and can be decoded without any restrictions imposed upon the operations of editing apparatus 1.

Upon completion of the transmission of the black I picture, controller 9 switches picture select switch 6 for transmission of repeat P pictures stored in repeat P picture server 5. Controller 9 will transmit a preset number of repeat P pictures in turn, one after another in sequence following the black I picture. Controller 9 will therefore determine preset time intervals between a main stream and sub-stream to be spliced to each other, determine a display time and transmission time for the inserted stream, and transmit a predetermined number of repeat P pictures corresponding to the determined time interval. In transmitting each repeat P picture, controller 9 monitors operation so that the bit occupancy will not exceed the buffer size (vbv_buffer_size) so that the inserted stream will not break down the VBV buffer. If the inserted stream overflows the VBV buffer, controller 9 will switch multiplexer 8 to transmit a stuffing byte generated by the stuffing byte generator 7 following each repeat P picture, thereby reducing the amount of data that will eventually be stored in the decoding buffer.

Figure 8:
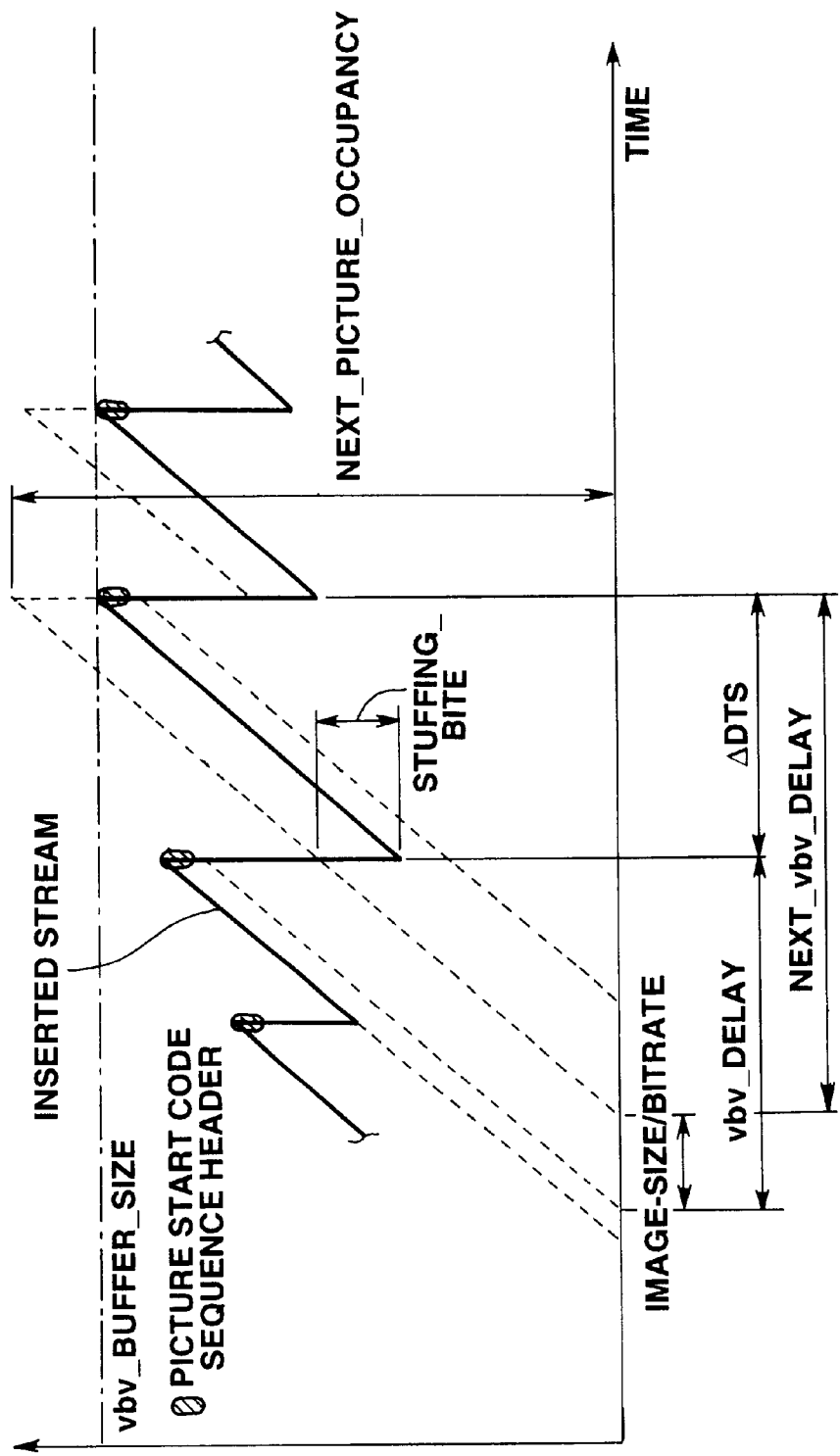
FIG. 8 shows a transition of the bit occupancy in the VBV buffer in accordance with a inserted stream generated by the editing apparatus of the invention.

More particularly, the data amount of the stuffing byte can be determined as shown in FIG. 8 and as will be described below. First, controller 9 determines a VBV delay (next_vbv_delay) of a next repeat P picture to be transmitted from a VBV delay (vbv_delay) and image size (image_size) of each repeat P picture, according to the equation $$\text{next\_vbv\_delay} = \text{vbv\_delay} - (\text{image\_size}/\text{bitrate}) + \Delta DTS$$

Controller 9 determines a bit occupancy (next_picture_occupancy) of a next repeat P picture to be transmitted from the determined VBV delay (next_vbv_delay) in accordance with the equation $$\text{next\_picture\_occupancy} = \text{next\_vbv\_delay} \times \text{bitrate}/\text{frequency}$$

The size of a stuffing byte to be inserted into each picture can be determined from a difference between the bit occupancy (next_picture_occupancy) of a next repeat P picture and the VBV buffer size (vbv_buffer_size) in accordance with the equation $$\text{stuffing-byte} = \text{vbv\_buffer\_size} - \text{next\_picture\_occupancy}$$

When next_vbv_occupancy is 55,048, bitrate is 3,000,000 BPS, vbv_buffer_size is 1,835,008 bits and frequency is 90 kHz, for example, the data amount of the stuffing byte can be determined by calculating the following relation:

$$\text{next\_picture\_occupancy} = 55048 \times 3000000/90000 = 1834933$$

$$\text{stuffing\_byte} = 1835008 - 1834933 = 75 \text{ bit} = 9.4 \text{ byte}$$

By repeating the insertion of a repeat P picture and a stuffing byte sequentially, thus generating a continuous inserted stream as an MPEG data stream while monitoring the inserted stream and VBV buffer size, editing apparatus 1 can generate a spliced stream without breaking down the VBV buffer.

Figure 9:
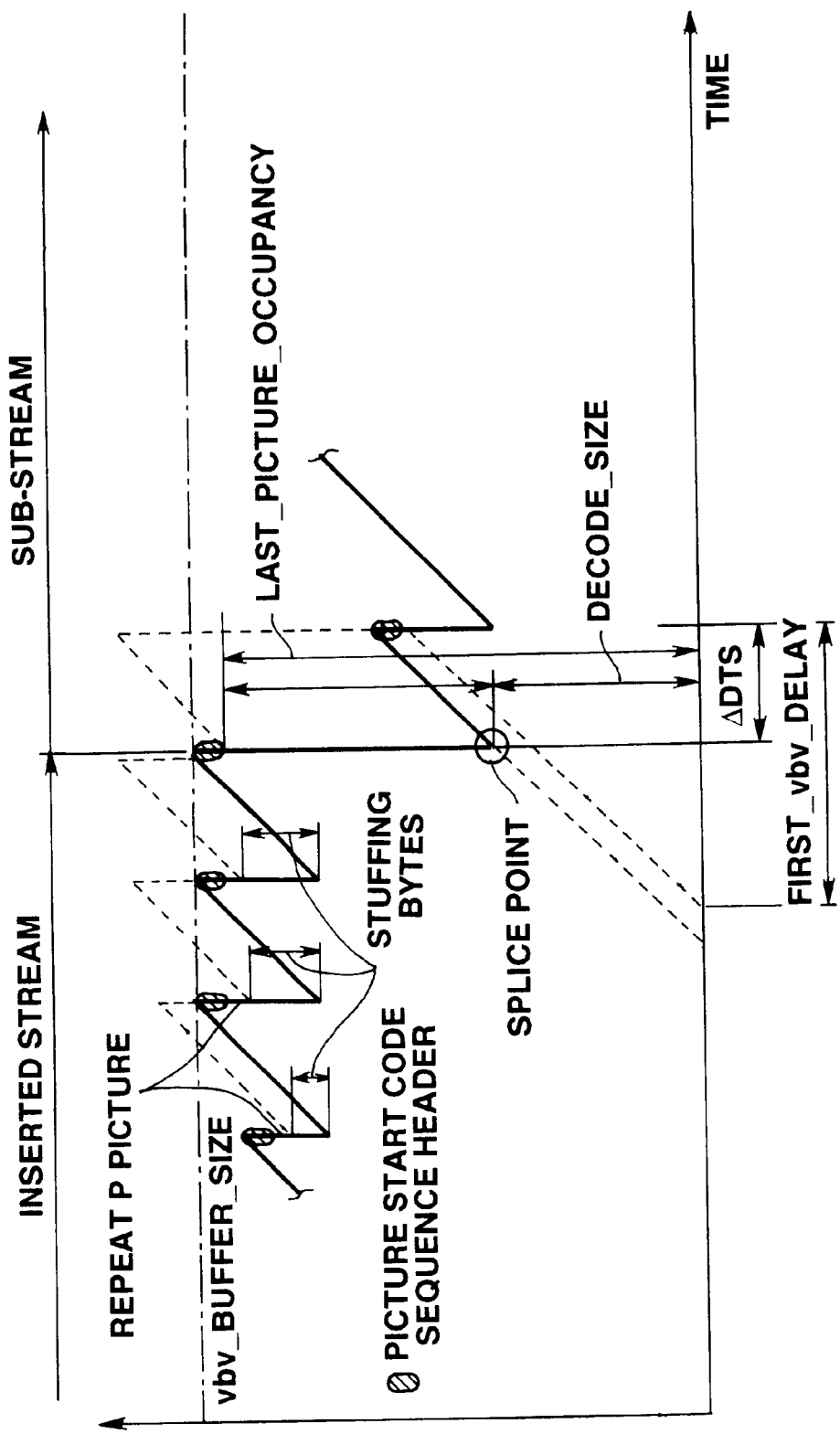
FIG. 9 shows a transition of the bit occupancy in the VBV buffer at a splice point between a inserted stream in a spliced stream generated by the editing apparatus of the invention and a sub-stream.

Further, upon completion of the transmission of a predetermined number of repeat P pictures, or upon completion of the transmission of data to a splice-out point of the inserted stream, controller 9 will switch the multiplexer 8 and start transmission of the sub-stream as shown in FIG. 9. At this time, controller 9 will adjust the data size of the stuffing byte to be inserted into the last picture in the inserted stream based on the VBV delay (first_vbv_delay) of the first picture in the sub-stream, this VBV delay of the first picture having been detected by VBV delay detector 3. In this manner, the inserted stream and sub-stream may be spliced to each other.

More particularly, controller 9 determines the data size of the stuffing byte to be inserted into the last picture in the inserted stream as will now be described. First, controller 9 determines the decode size of the first picture of the sub-stream (first_picture_decode_size) at the splice point between the inserted stream and the first picture of the sub-stream in accordance with the following equation:

$$\text{first\_picture\_decode\_size} = (\text{first\_vbv\_delay} - \Delta DTS) \times \text{bitrate} + \text{picture\_start\_code} + \text{sequence\_header},$$

where the picture_start_code and the sequence_header are those of the first picture in the sub-stream. Then, controller 9 calculates a stuffing byte (stuffing_byte) to be inserted into the last picture in the inserted stream from the decode size of the first picture of the sub-stream (first_picture_decode_size) and a bit occupancy (last_picture_occupancy) of the last picture in the inserted stream in accordance with the equation.

$$\text{stuffing\_byte} = \text{last\_picture\_occupancy} - \text{first\_picture\_decode\_size}.$$

Editing apparatus 1 splices the inserted stream and the sub-stream continuously to each other by inserting the stuffing byte thus determined following the last picture in the inserted stream to generate a spliced stream. The continuous spliced stream can be decoded without breaking down the input buffer and without any restrictions on the operations of editing apparatus 1.

Figure 10:
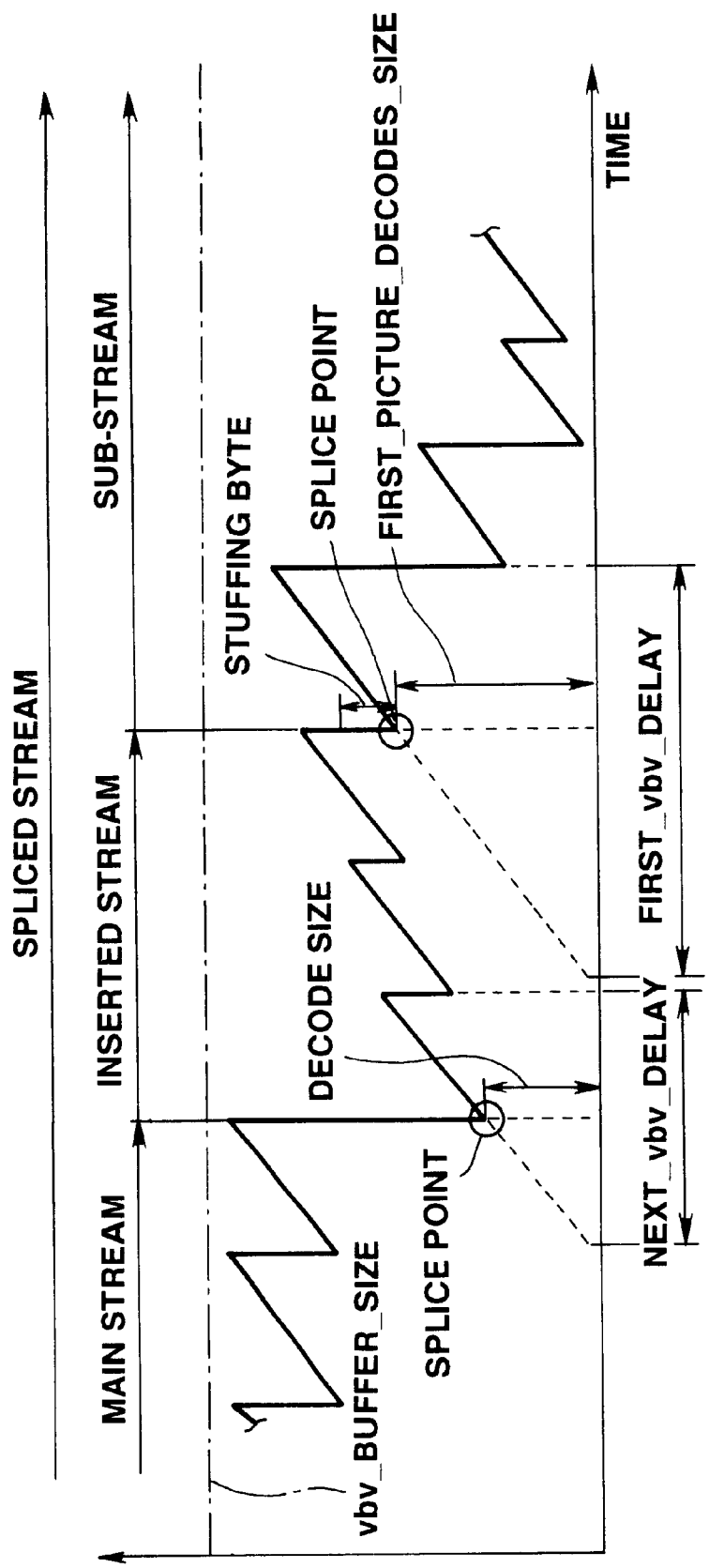
FIG. 10 shows a transition of the bit occupancy in the VBV buffer in accordance with a spliced stream generated by the editing apparatus of the invention.

While the format of the inserted stream to be inserted between the main stream and sub-stream has been described above, in an alternative embodiment, the inserted stream may have the following format. In the inserted stream, the top I picture is not limited only to a black picture. Namely, the first image in the inserted stream may be any picture which is not limited in color and content. For example, when a black picture is inserted at the front of the inserted stream, it will be displayed between the main stream and sub-stream on a monitor. However, a blue picture, green picture or a predetermined comment or still image may be displayed between the main stream and sub-stream. Also, the I picture need not be inserted at the front of the inserted stream, but a repeat P picture may be inserted at the front. In this case, the last image in the main stream will be displayed as a frozen image. Further, the repeat P pictures in the inserted stream may not be limited to a fixed number but the number of the repeat P pictures may be variable depending upon the relation between the main stream and sub-stream. As shown in FIG. 10, for example, the decode size (first_picture_decode_size) of a splice point between the inserted stream and sub-stream may be determined as shown above. Similarly, the decode size (decode_size) of the splice point between the main stream and sub-stream may also be determined. When one repeat P picture is inserted, a predetermined bit occupancy will be added, and thus a minimum necessary number of repeat P pictures to be inserted is calculated based on a difference between the decode size (first_picture_decode_size) of the splice point between the inserted stream and sub-stream and the decode size (decode_size) of the splice point between the main stream and sub-stream. In this case, the number of repeat P pictures included in the inserted stream can be set to a minimum required number.

Next, the operation of editing apparatus 1 will be described making reference to the flow charts in FIGS. 11 and 12. First at Step S1 shown in FIG. 11, when a main stream is supplied to editing apparatus 1, a VBV delay (next_vbv_delay) of a picture to be transmitted next, after the last picture in the main stream is determined as noted above. At Step S2, it is determined whether an I picture or repeat P picture is inserted as the first picture of an inserted stream. For insertion of the I picture, the operation proceeds to Step S3. For inserting of the repeat P picture, the operation proceeds to Step S4. This selection may be performed by a user.

At Step S3, an I picture being a black picture, for example, is inserted as the first picture in the inserted stream. Then a bit occupancy (first_picture_occupancy) of the black I picture is determined as noted above, and is written into the picture header. Also, if the bit occupancy (next_picture_occupancy) of a next repeat P picture exceeds the VBV buffer size (vbv_buffer_size), the size of a stuffing byte (stuffing_byte) is determined as noted above and is inserted into the first picture in the inserted stream. The operation then proceeds from Step S3 to Step S4. At Step S4, it is determined whether the number of repeat P pictures to be inserted into the inserted stream is a fixed number, or is a minimum necessary number of pictures to be determined. If the number of repeat P pictures is to be fixed, the operation proceeds to Step S5. When the number of repeat P pictures is to be a minimum number of pictures to be determined, the operation proceeds to Step 10 shown in FIG 12. This selection may be performed by a user.

At Step S5, a repeat P picture is inserted. Next at Step S6, the bit occupancy (next_picture_occupancy) of a next repeat P picture is calculated, and at next Step S7, it is determined whether the bit occupancy (next_picture_occupancy) of a next repeat P picture exceeds the VBV buffer size (vbv_buffer_size). If the bit occupancy exceeds the VBV buffer size, the size of a stuffing byte (stuffing_byte) is determined at Step S8 as noted above and is inserted. Then, operation proceeds to Step S9. If the determined bit occupancy does not exceed the VBV buffer size, the operation proceeds directly to Step S9.

At next Step S9, it is determined whether a set number of repeat P pictures has completely been inserted. If the determination is answered in the affirmative, operation proceeds to Step S16. If the determination is answered in the negative, the operation returns to Step S5 and the procedure from Step S5 is repeated.

On the other hand, if it is determined at step S4 that the number of repeat P pictures is to be a calculated minimum number, operation proceeds to step S10. At Step S10 shown in FIG. 12, the decode size (first_picture_size) of the splice point between the inserted stream and sub-stream, and the decode size (decode_size) of the splice point between the main stream and sub-stream, are determined. Further, at Step S11, a repeat P picture is inserted, and at Step S12, the bit occupancy (next_picture_occupancy) of a next repeat P picture is calculated.

At Step S13, it is determined whether the bit occupancy (next_picture_occupancy) of a next repeat P picture exceeds the VBV buffer size (vbv_buffer_size). If the bit occupancy of the next P picture is determined to exceed, the VBV buffer size, the size of a stuffing byte (stuffing_byte) is determined at Step S14 as noted above, and is inserted. Operation then proceeds to Step S15. If the bit occupancy of the next repeat P picture is determined not to exceed the VBV buffer size, the operation proceeds directly to Step S15.

At Step S15, it is determined whether the current decode size exceeds the decode size (first_picture_decode_size) of the splice point between the inserted stream and sub-stream. If the determination is answered in the affirmative, operation proceeds to Step S16 shown in FIG. 11. If the determination is answered in the negative, operation is returned to step S10, and the procedure from Step S10 is repeated.

Figure 11:
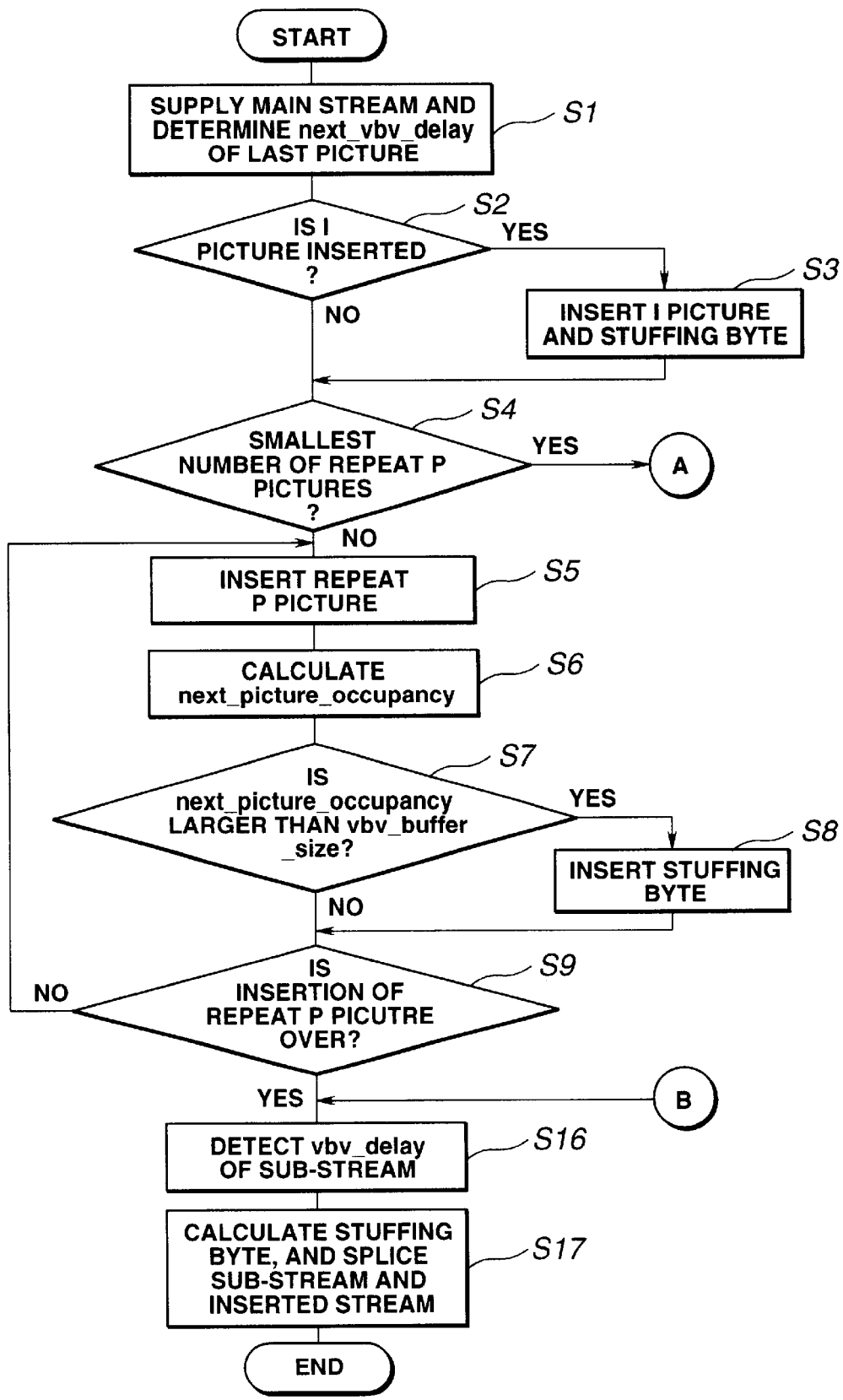
FIG. 11 is a flow chart depicting the operation of the editing apparatus in accordance with the invention.
Figure 12:
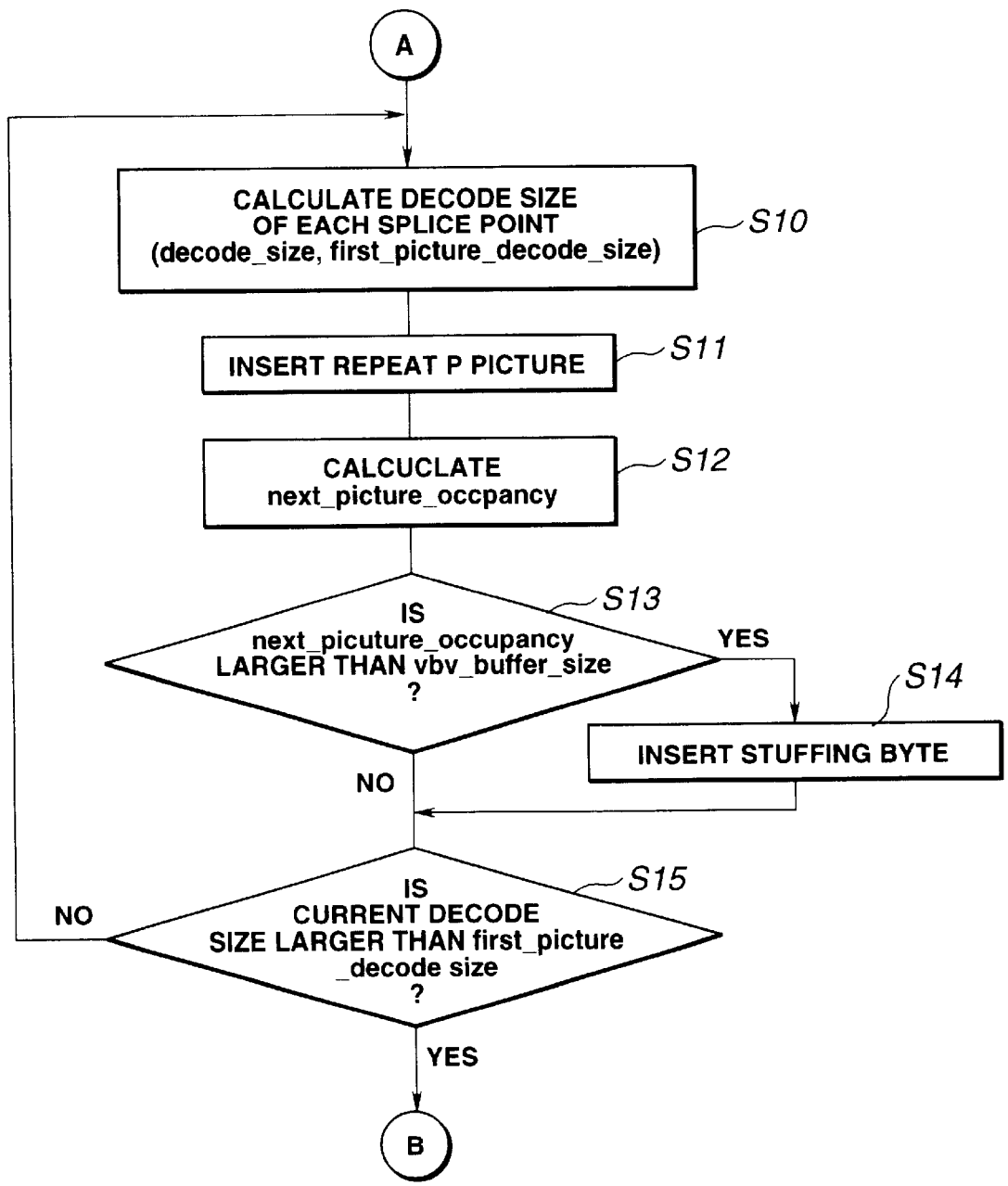
FIG. 12 is a further flow chart depicting operation of the editing apparatus in accordance with the invention.

At Step S16 shown in FIG. 11, the VBV delay (first_vbv_delay) of the first picture in the sub-stream is detected, and at Step S17, the size of the stuffing byte (stuffing_byte) to be inserted into the last picture in the inserted stream is determined as noted above, and the stuffing byte is inserted. The inserted stream and sub-stream are then spliced to each other at the splice point and the operation is completed.

By conducting the operations included in Steps S1 to S17, the editing apparatus 1 inserts the inserted stream between the main stream and sub-stream to generate a continuous spliced stream. As described, the embodiment of the editing apparatus according to the present invention generates an inserted stream in which the bit occupancy of the inserted stream in the first VBV buffer coincides with the bit occupancy in the VBV buffer of the main stream at the splice point, and the bit occupancy of the inserted stream in the last VBV buffer coincides with the bit occupancy in the VBV buffer of the sub-stream at an arbitrary splice point. Thus, editing apparatus 1 can splice the main stream and sub-stream continuously to each other without breaking down the VBV buffer. A spliced stream generated through splicing of two streams can also be decoded as usual without breaking down the buffer provided at the input stage in the decoder, namely, with no overflow and underflow, as well as with no restrictions imposed upon the editing operations.

Figure 13:
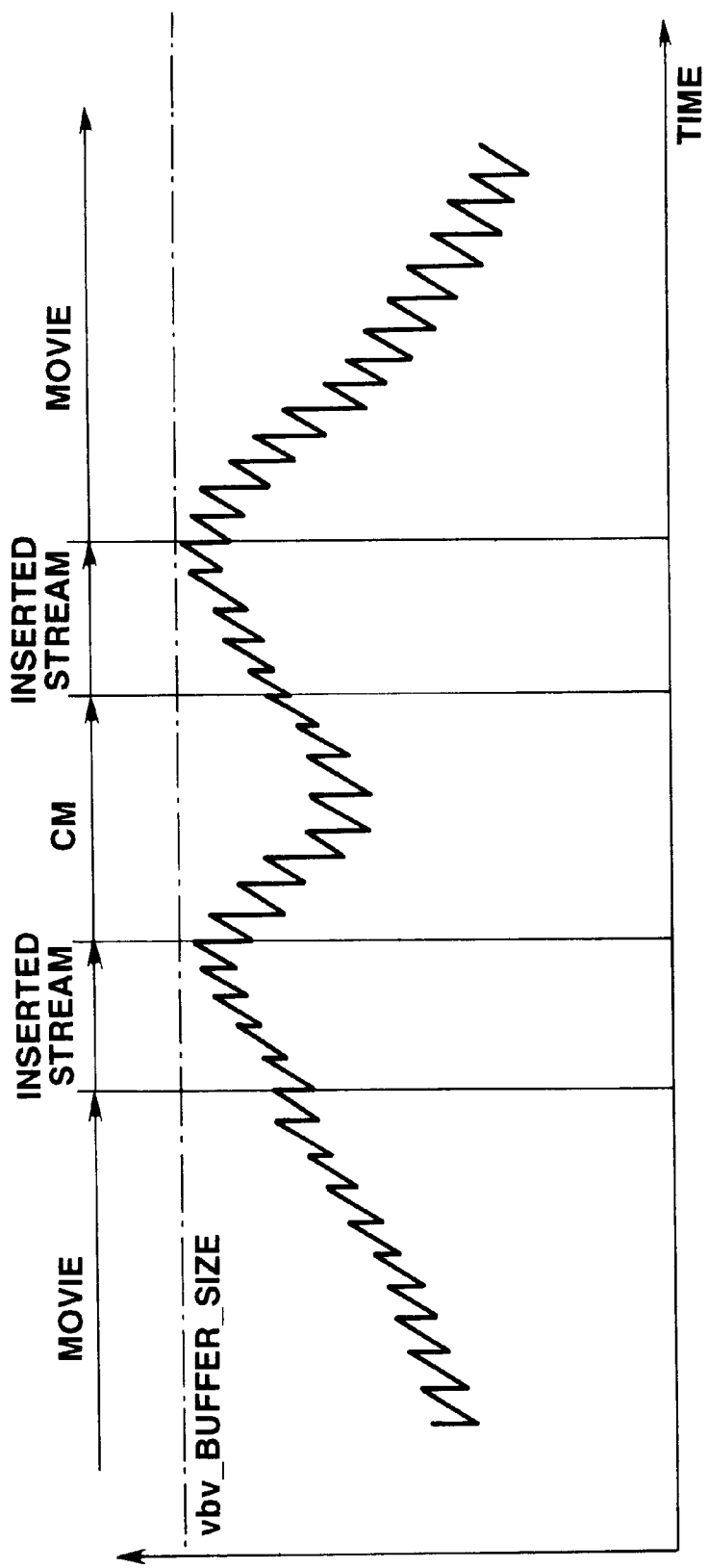
FIG. 13 is a drawing depicting operations by which commercials are inserted into a continuous picture data such as a movie.
Figure 14:
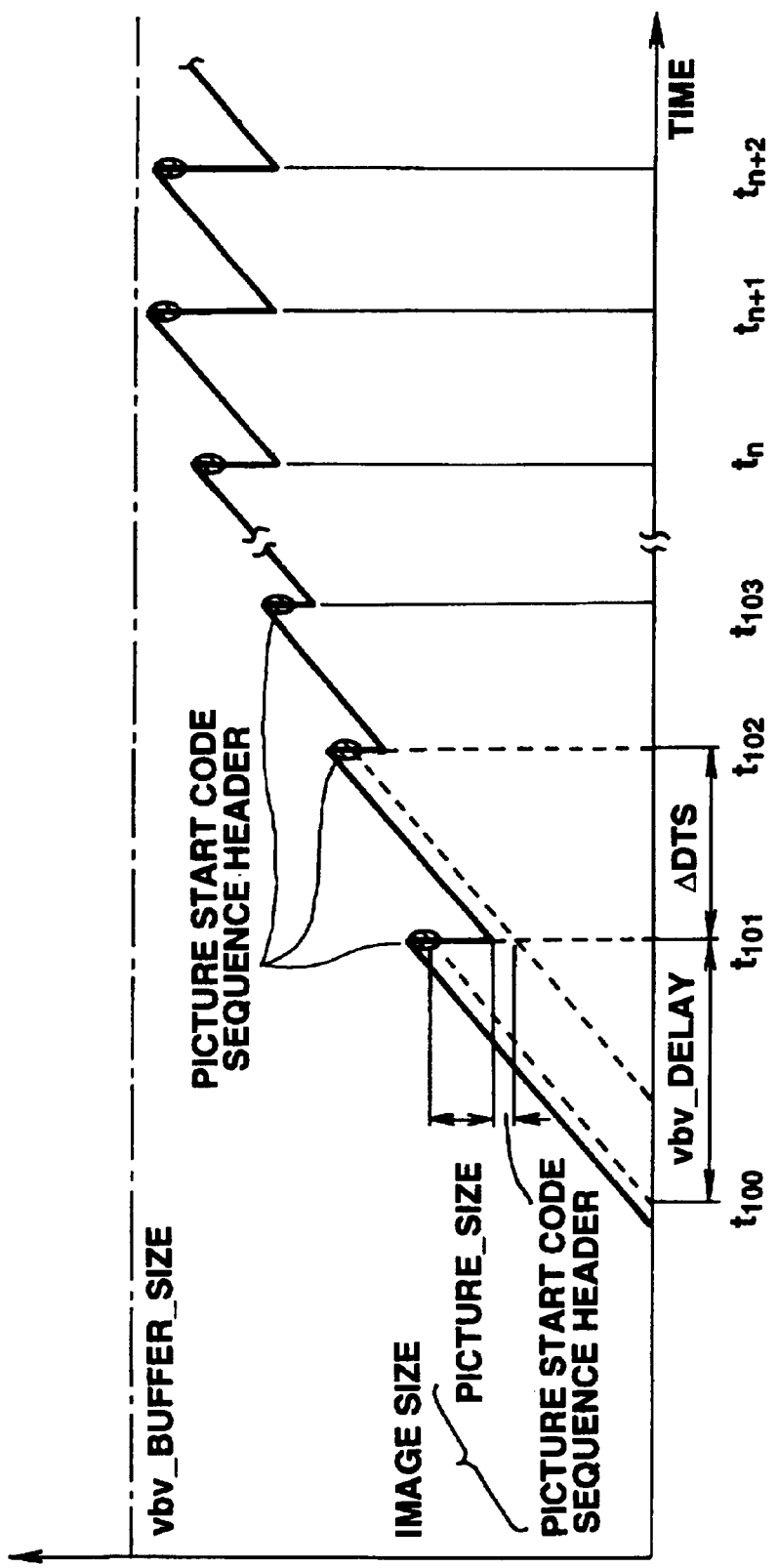
FIG. 14 illustrates a transition of the bit occupancy by an MPEG stream in an input buffer provided upstream of a decoder when the input buffer is supplied with the MPEG stream.
Figure 15:
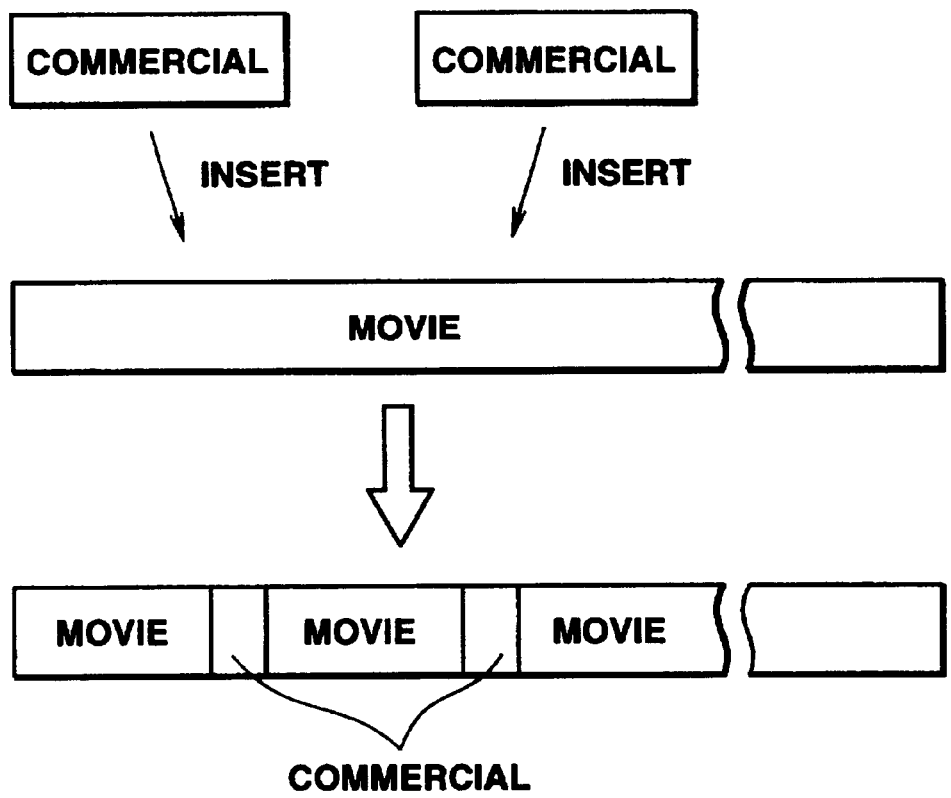
FIG. 15 is an illustration depicting commercials being inserted in a movie to produce a program.
Figures 16A, 16B, 16C:
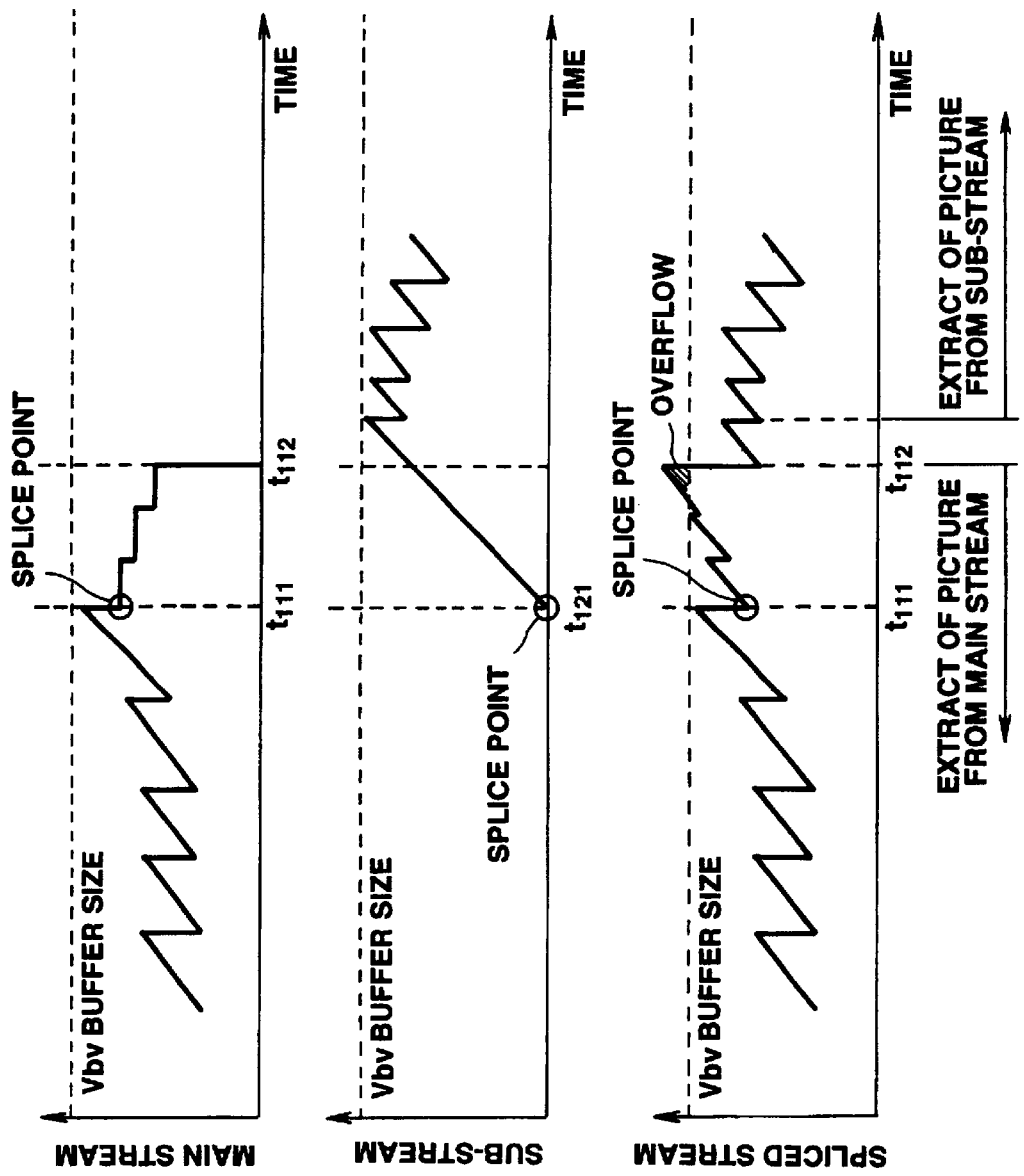
FIGS. 16A to 16C show a bit occupancy by a main stream, a sub-stream and a spliced stream in a VBV buffer in a conventional apparatus, respectively.
Figures 17A, 17B, 17C:
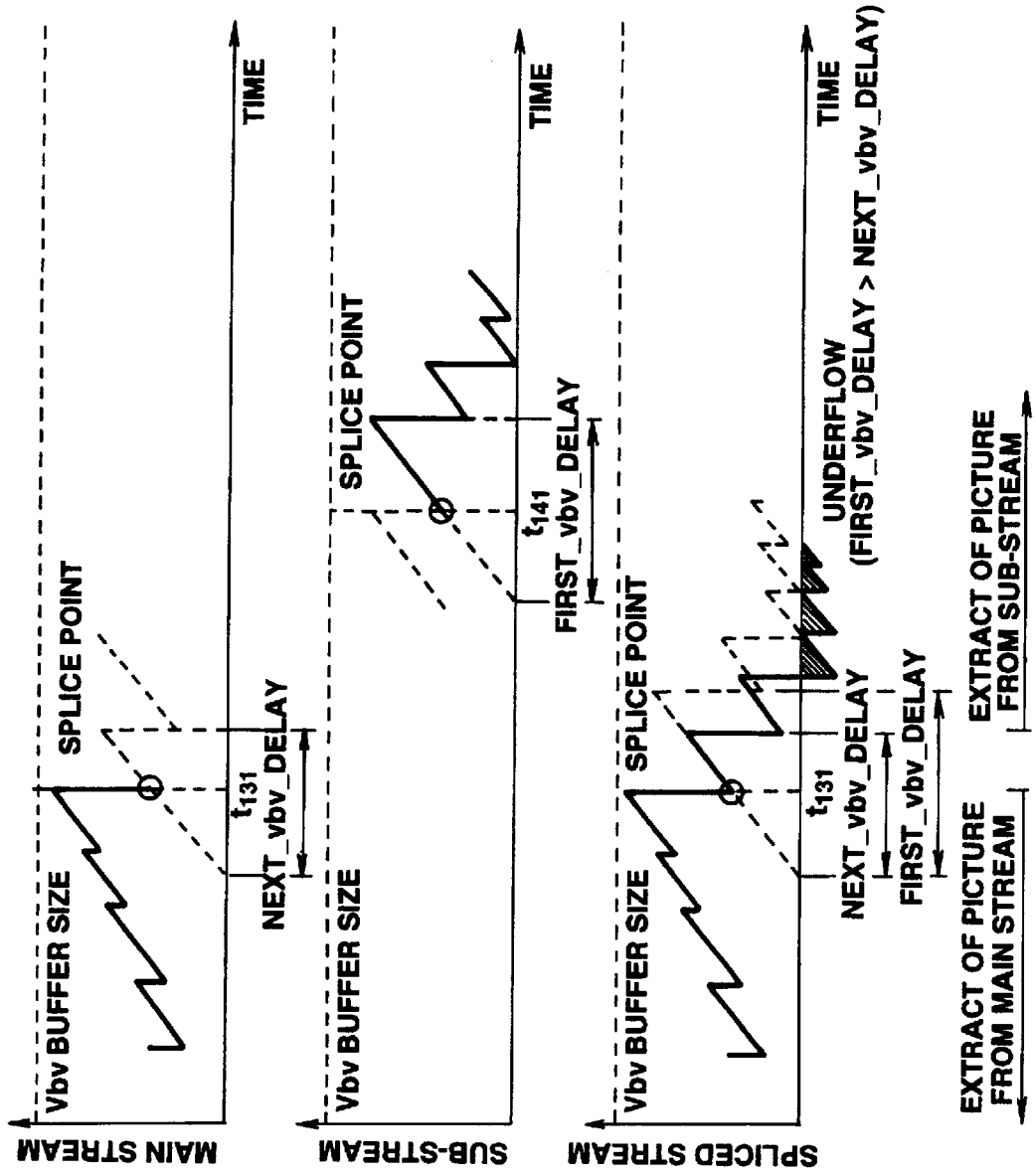
FIGS. 17A to 17C show a bit occupancy by a main stream, a sub-stream and a spliced stream in a VBV buffer in a conventional apparatus, respectively.
Figures 18A, 18B, 18C:
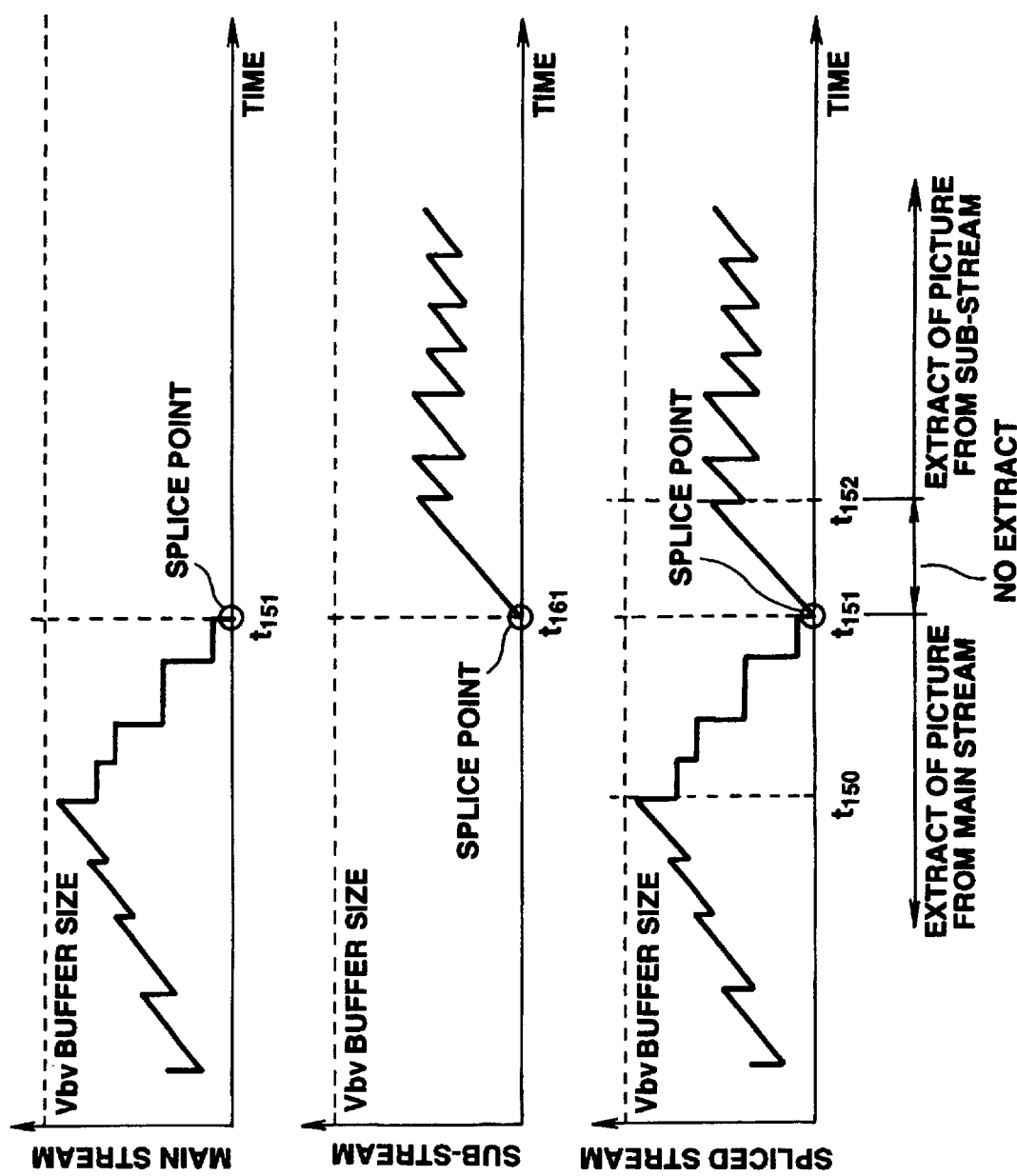
FIGS. 18A to 18C also show a bit occupancy by a main stream, a sub-stream and a spliced stream apparatus, in a VBV buffer in a conventional apparatus, respectively.

It should be noted that the editing apparatus 1 according to the present invention can insert commercials into a part of a succession of moving pictures like a movie as shown in FIG. 13, for example, by swapping the main stream and sub-stream input terminals with each other. First, a former half of the picture data such as a movie is taken as the main stream while the commercials are taken as sub-streams. Thus, a commercial is spliced to the former half of the movie. Then, the commercial spliced to the former half of the movie is taken as the main stream while the later half of the movie is taken as the sub-stream. The latter half of the movie is spliced to the commercial. Thus, the editing apparatus 1 can insert commercials into a part of a succession of moving pictures like a movie.

Furthermore, the invention may be realized as a computer program performed in a general purpose computer, having input to it a main stream and a sub-stream, and outputting a combined stream.

The compressed picture data editing apparatus and method according to the present invention is adapted to insert between first and second elementary streams an inserted stream so that a bit occupancy in a virtual buffer for controlling a first amount of code generation coincides with a bit occupancy in the virtual buffer by the first elementary stream at an arbitrary splice point and a bit occupancy in a virtual buffer for controlling a last amount of code generation coincides with a bit occupancy in the virtual buffer by the second elementary stream at an arbitrary splice point, to thereby generate a continuous compressed picture data stream. A recording medium in accordance with the invention is adapted to store the continuous compressed picture data stream. Thus, the compressed picture data editing apparatus, method and recording medium according to the present invention can splice two data streams of compressed picture data directly to each other without breaking down the virtual buffer for controlling the amount of code generation. Therefore, an elementary stream generated through splicing of the two compressed picture data to each other can be decoded as usual without breaking the buffer provided at the input stage, namely, without overflowing and underflowing as well as with no restrictions imposed on the editing operations.

Also, the apparatus and method according to the present invention can insert between first and second elementary streams, an elementary inserted stream which will not break down the virtual buffer for controlling the amount of code generation, by inserting between the first and second elementary streams, the elementary inserted stream in which a compressed picture data and a pseudo data are inserted.

Additionally, the apparatus and method according to the present invention permit the display of a still image of an arbitrary splice point of the first compressed picture data and also display of an arbitrary image such as a black picture or the like, while an inserted elementary inserted stream is inserted between the splice points of the first and second elementary streams, respectively, by inserting a coded picture, repeat picture or the like as the elementary inserted stream.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed:

1. A method for splicing a first elementary data stream containing first compressed picture data and a second elementary data stream containing a second compressed picture data to generate a spliced elementary data stream containing a spliced continuous compressed picture data, said spliced elementary data stream being generated by inserting an inserted elementary data stream between an arbitrary splice point of the first elementary data stream and an arbitrary splice point of the second elementary data stream, said method comprising the steps of:

providing a virtual buffer for controlling an amount of code data which is generated;

detecting a bit occupancy in said virtual buffer at an arbitrary splice point of said first elementary data stream;

detecting a bit occupancy in said virtual buffer at an arbitrary splice point of said second elementary data stream; and controlling said inserted elementary data stream so that a first bit occupancy of the inserted elementary data stream in said virtual buffer equals the bit occupancy in said virtual buffer at the arbitrary splice point of the first elementary data stream and a last bit occupancy of the inserted elementary data stream in said virtual buffer equals the bit occupancy in said virtual buffer at the arbitrary splice point of the second elementary data stream.

2. The method according to claim 1, further comprising the step of:

generating the spliced elementary data stream by inserting the inserted elementary data stream between the arbitrary splice point of the first elementary data stream and the arbitrary splice point of the second elementary data stream.

3. The method according to claim 1, wherein the inserted elementary data stream comprises a predetermined compressed picture data and pseudo data.

4. The method according to claim 3, wherein the virtual buffer exhibits a predetermined size; and further comprising the steps of:

determining if the bit occupancy of the inserted elementary data stream in the virtual buffer exceeds the predetermined size of the virtual buffer; and controlling the pseudo data to have a size larger than the data amount that the inserted elementary data stream exceeds the predetermined size of the virtual buffer.

5. The method according to claim 3, wherein the inserted elementary data stream includes at least one intra-coded picture.

6. The method according to claim 5, wherein the at least one intra-coded picture is a black picture.

7. The method according to claim 5, wherein the inserted elementary data stream includes at least one repeat picture following the intra-coded picture, the repeat picture repeatedly displaying a proceeding picture.

8. The method according to claim 7, further comprising the step of inserting at least one repeat picture until the last bit occupancy of the inserted elementary data stream in the virtual buffer exceeds the bit occupancy in the virtual buffer at the arbitrary splice point of the second elementary data stream; and inserting pseudo data into the spliced elementary data stream thereafter.

9. The method according to claim 3, wherein the inserted elementary data stream includes a number of repeat pictures, the repeat picture repeatedly displaying a previously displayed picture.

10. The method according to claim 9, further comprising the step of inserting at least one repeat picture until the last bit occupancy of the inserted elementary data stream in the virtual buffer exceeds the bit occupancy in the virtual buffer at the arbitrary splice point of the second elementary data stream; and inserting pseudo data into the spliced elementary data stream thereafter.

11. The method according to claim 1, wherein the first and second elementary data streams and the inserted elementary data stream are coded data according to MPEG video format, respectively.

12. The method according to claim 11, wherein the inserted elementary data stream comprises a predetermined coded picture data coded by MPEG video format and a stuffing byte defined in MPEG video format.

13. The method according to claim 12, further comprising the steps of:

detecting the bit occupancy in the virtual buffer (VBV buffer) by the following equation:

$$\text{bit occupancy} = VBV\_delay \times (\text{bitrate/frequency})$$

wherein VBV_delay represents a VBV delay of a picture in an elementary data stream coded by MPEG video format, bitrate represents a bitrate of the elementary data stream and the frequency represents a clock frequency of the virtual buffer.

14. The method according to claim 13, further comprising the step of detecting a VBV delay (next_vbv_delay) of a picture to be inserted next, after a last picture in the first elementary data stream, by the following equation:

$$\text{next\_vbv\_delay} = \text{last\_vbv\_delay} - (\text{image\_size}/\text{bitrate}) + \Delta DTS$$

wherein last_vbv_delay represents a VBV delay of a last picture of the first elementary data stream, image_size represents an image size of the last picture and ΔDTS represents an interval of Decode Time Stamp; and wherein the controlling step detects the first bit occupancy of the inserted elementary data stream in the virtual buffer based on the VBV delay (next_vbv_delay) as a VBV delay of a first picture of the inserted elementary data stream.

15. The method according to claim 14, further comprising the step of detecting the bit occupancy (first_picture_decode_size) in the virtual buffer at the arbitrary splice point of the second elementary data stream by the following equation:

$$\text{first\_picture\_decode\_size} = (\text{first\_vbv\_delay} - \Delta DTS) \times \text{bitrate} + \text{picture\_start\_code} + \text{sequence\_header}$$

wherein first_vbv_delay represents a VBV delay of a first picture in the second elementary data stream, picture_start_code represents a picture start code of the first picture of the second elementary data stream, and sequence_header represents a sequence header of the first picture of the second elementary data stream; and wherein the controlling step inserts the stuffing byte along with the last picture of the inserted elementary data stream in accordance with the bit occupancy (first_picture_decode_size) so that the last bit occupancy of the inserted elementary data stream in the virtual buffer equals the bit occupancy (first_picture decode_size).

16. The method according to claim 11, further comprising the steps of detecting the bit occupancy (first picture_decode_size) in the virtual buffer at the arbitrary splice point of the second elementary data stream by the following equation:

$$\text{first picture\_decode\_size} = (\text{first\_vbv\_delay} - \Delta DTS) \times \text{bitrate} + \text{picture\_start\_code} + \text{sequence\_header}$$

wherein first_vbv_delay represents a VBV delay of a first picture in the second elementary data stream, picture start_code represents a picture start code of the first picture of the second elementary data stream, sequence_header represents a sequence header of the first picture of the second elementary data stream and ΔDTS represents an interval of Decode Time Stamp; and wherein a stuffing byte is inserted along with the last picture of the inserted elementary data stream in accordance with the bit occupancy (first_picture_decode_size) so that the last bit occupancy of the inserted elementary data stream in the virtual buffer equals the bit occupancy (first_picture_decode_size).

17. The method according to claim 11, further comprising the steps of:

detecting a VBV delay (next_vbv_delay) of a picture to be inserted next to a selected picture in the inserted elementary data stream by the following equation:

$$\text{next\_vbv\_delay} = \text{vbv\_delay} - (\text{image\_size}/\text{bitrate}) + \Delta DTS$$

wherein vbv_delay represents VBV delay of the selected picture of the inserted elementary data stream, image_size represents an image size of the selected picture and ΔDTS represents an interval of Decode Time Stamp; and inserting a stuffing byte corresponding to a data amount that the bit occupancy exceeds the virtual buffer along with the selected picture when the bit occupancy of the picture to be inserted next to the selected picture exceeds the virtual buffer.

18. The method according to claim 11, wherein the inserted elementary data stream includes at least one intra-coded picture.

19. The method according to claim 18, wherein the at least one intra-coded picture is a black picture.

20. The method according to claim 18, wherein the inserted elementary data stream includes at least one repeat picture following the intra-coded picture, the repeat picture repeatedly displaying a previously displayed picture.

21. The method according to claim 20, further comprising the step of:

inserting at least one repeat picture until the last bit occupancy of the inserted elementary data stream in the virtual buffer exceeds the bit occupancy in the virtual buffer at the arbitrary splice point of the second elementary data stream; and inserting the pseudo data into the spliced elementary data stream thereafter.

22. The method according to claim 12, wherein the inserted elementary data stream includes at least one of said repeat pictures, the repeat picture repeatedly displaying a previously displayed picture.

23. The method according to claim 22, wherein the controlling step inserts the number of repeat pictures until the last bit occupancy of the inserted elementary data stream in the virtual buffer exceeds the bit occupancy in the virtual buffer at the arbitrary splice point of the second elementary data stream and then inserts a stuffing byte into the spliced elementary data stream.

24. The method according to claim 15, wherein the inserted elementary data stream includes at least one repeat picture following at least one intra-coded picture, the repeat picture repeatedly displaying a proceeding picture.

25. Apparatus for splicing a first elementary data stream containing a first compressed picture data and a second elementary data stream containing a second compressed picture data to generate a spliced elementary data stream containing a spliced continuous compressed picture data, said spliced elementary data stream being generated by inserting an inserted elementary data stream between an arbitrary splice point of the first elementary data stream and an arbitrary splice point of the second elementary data stream, said apparatus comprising:

a first detector for detecting a bit occupancy in a virtual buffer at an arbitrary splice point of said first elementary data stream, said virtual buffer for controlling an amount of generated code data;

a second detector for detecting a bit occupancy in said virtual buffer at an arbitrary splice point of said second elementary data stream;

a controller for controlling said inserted elementary data stream so that a first bit occupancy of the inserted elementary data stream in said virtual buffer equals the bit occupancy in said virtual buffer at said arbitrary splice point of the first elementary data stream, and a last bit occupancy of the inserted elementary data stream in said virtual buffer equals the bit occupancy in said virtual buffer at said arbitrary splice point of the second elementary data stream; and a multiplexer for inserting the inserted elementary data stream between the arbitrary splice point of the first elementary data stream and the arbitrary splice point of the second elementary data stream to generate the spliced elementary data stream.

26. The apparatus according to claim 25, wherein the inserted elementary data stream comprises a predetermined compressed picture data and pseudo data.

27. The apparatus according to claim 25, wherein the virtual buffer exhibits a predetermined size; and the controller determines when the bit occupancy of the inserted elementary data stream in the virtual buffer exceeds the predetermined size of the virtual buffer, and inserts pseudo data to have a size larger than the data amount that the inserted elementary data stream exceeds the predetermined size of the virtual buffer.

28. The apparatus according to claim 25, wherein the inserted elementary data stream includes at least one intra-coded picture.

29. The apparatus according to claim 28, wherein the at least one intra-coded picture is a black picture.

30. The apparatus according to claim 28, wherein the inserted elementary data stream includes at least one repeat picture following the intra-coded picture, the repeat picture repeatedly displaying a proceeding picture.

31. The apparatus according to claim 30, wherein the said controller inserts the at least one repeat picture until the last bit occupancy of the inserted elementary data stream in the virtual buffer exceeds the bit occupancy in the virtual buffer at the arbitrary splice point of the second elementary data stream and then inserts a pseudo data into the spliced elementary data stream.

32. The apparatus according to claim 25, wherein the inserted elementary data stream includes at least one repeat picture, the repeat picture repeatedly displaying a previously displayed picture.

33. The apparatus according to claim 32, wherein said controller inserts at least one repeat picture until the last bit occupancy of the inserted elementary data stream in the virtual buffer exceeds the bit occupancy in the virtual buffer at the arbitrary splice point of the second elementary data stream, and then inserts a pseudo data into the spliced elementary data stream.

34. The apparatus according to claim 25, wherein the first and second elementary data streams and the inserted elementary data stream are coded data according to MPEG video format, respectively.

35. The apparatus according to claim 34, wherein the inserted elementary data stream comprises a predetermined coded picture data coded by MPEG video format and a stuffing byte defined in MPEG video format.

36. The apparatus according to claim 35, wherein the controller detects the bit occupancy in the virtual buffer (VBV buffer) by the following equation:

$$\text{bit occupancy} = VBV\_delay \times (bitrate/frequency),$$

and wherein VBV delay represents a VBV delay of a picture in an elementary data stream coded by MPEG video format, bitrate represents a bit rate of the elementary data stream, and the frequency represents a clock frequency of the virtual buffer.

37. The apparatus according to claim 36, further comprising a detector for detecting a VBV delay (next_vbv_delay) of a picture to be inserted next after a last picture in the first elementary data stream, by the following equation:

$$next\_vbv\_delay = last\_vbv\_delay - (image\_size/bitrate) + \Delta DTS,$$

wherein last_vbv_delay represents a VBV delay of a last picture of the first elementary data stream, image_size represents an image size of the last picture and ΔDTS represents an interval of Decode Time Stamp; and wherein the controller detects the first bit occupancy of the inserted elementary data stream in the virtual buffer based on the VBV delay (next_vbv_delay) as a stream coded by MPEG video format, the bitrate representing a bit rate and the frequency representing a clock frequency for representing the VBV delay (next_VBV_delay).

38. The apparatus according to claim 37, further comprising a detector for detecting a VBV delay (next_vbv_delay) of a picture to be inserted next, after a last picture in the first elementary data stream by the following equation:

$$next\_vbv\_delay = last\_vbv\_delay - (image\_size/bitrate) + \Delta DTS,$$

wherein last_vbv_delay represents a VBV delay of a last picture of the first elementary data stream, image_size represents an image size of the last picture of the first elementary data stream and ΔDTS represents an interval of Decode Time Stamp; and wherein the controller detects the first bit occupancy of the inserted elementary data stream in the virtual buffer based on the VBV delay (next_vbv_delay) of a first picture of the inserted elementary data stream.

39. The apparatus according to claim 38, further comprising:

a second detector for detecting the bit occupancy (first_picture_decode_size) in the virtual buffer at the arbitrary splice point of the second elementary data stream by the following equation:

$$first\_picture\_decode\_size = (first\_vbv\_delay - \Delta DTS) \times bitrate + picture\_start\_code + sequence\_header,$$

wherein first_vbv_delay represents a VBV delay of a first picture in the second elementary data stream, picture_start_code represents a picture start code of the last picture of the second elementary data stream, sequence_header represents the sequence header of the first picture of the second elementary data stream and ΔDTS represents an interval of Decode Time Stamp; and wherein the controller inserts a stuffing byte along with the last picture of the inserted elementary data stream in accordance with the bit occupancy (first_picture_decode_size) so that the last bit occupancy of the inserted elementary data stream in the virtual buffer equals the bit occupancy (first_picture_decode_size).

40. The apparatus according to claim 39, wherein the controller detects a VBV delay (next_vbv_delay) of a picture to be inserted next to a selected picture in the inserted elementary data stream by the following equation:

$$next\_vbv\_delay = vbv\_delay - (image\ size/bitrate) + \Delta DTS,$$

wherein vbv_delay represents VBV delay of the certain picture of the inserted elementary data stream, image_size represents an image size of the certain VBV delay of a first picture of the inserted elementary data stream and ΔDTS represents an interval of Decode Time Stamp.

41. The apparatus according to claim 37, wherein the controller detects the bit occupancy (first_picture_decode_size) in the virtual buffer (VBV buffer) at the arbitrary splice point of the second elementary data stream by the following equation:

$$\text{first\_picture\_decode\_size} = (\text{first\_vbv\_delay} - \Delta DTS) \times \text{bitrate} + \text{picture\_start\_code} + \text{sequence\_header},$$

wherein first_vbv_delay represents a VBV delay of a first picture in the second elementary data stream, picture_start_code represents a picture start code of the first picture of the second elementary data stream, sequence header represents sequence header of the first picture of the second elementary data stream and ΔDTS represents an interval of Decode Time Stamp; and wherein the controller inserts a stuffing byte along with the last picture of the inserted elementary data stream in accordance with the bit occupancy (first_picture_decode_size) so that the last bit occupancy of the inserted elementary data stream in the virtual buffer (VBV buffer) is equal to the bit occupancy (first_picture_decode_size).

42. The apparatus according to claim 41, wherein the controller detects a VBV delay (next_vbv_delay) of a picture to be inserted next to a selected picture in the inserted elementary data stream by the following equation:

$$\text{next\_vbv\_delay} = \text{vbv\_delay} - (\text{image\_size}/\text{bitrate}) + \Delta DTS$$

wherein vbv_delay represents VBV delay of the selected picture of the inserted elementary data stream, image_size represents an image size of the selected picture and ΔDTS represents an interval of Decode Time Stamp; and wherein the controller inserts a stuffing byte corresponding to a data amount that the bit occupancy exceeds the virtual buffer along with the selected picture when the bit occupancy of the picture to be inserted next to the selected picture exceeds the virtual buffer.

43. The apparatus according to claim 35, wherein the controller detects the bit occupancy (first_picture_decode_size) in the virtual buffer at the arbitrary splice point of the second elementary data stream by the following equation:

$$\text{first\_picture\_decode\_size} = (\text{first\_vbv\_delay} - \Delta DTS) \times \text{bitrate} + \text{picture\_start\_code} + \text{sequence\_header}$$

wherein first_vbv_delay represents a VBV delay of a first picture in the second elementary data stream, picture_start_code represents a picture picture start code of the first picture of the second elementary data stream, sequence_header represents a sequence header of the first picture of the second elementary data stream and ΔDTS represents an interval of Decode Time Stamp; and wherein the controller inserts a stuffing byte along with the last picture of the inserted elementary data stream in accordance with the bit occupancy (first_picture_decode_size) so that the last bit occupancy of the inserted elementary data stream in the virtual buffer is equal to the bit occupancy (first_Picture_decode_size).

44. The apparatus according to claim 35, wherein the controller detects a VBV delay (next_vbv_delay) of a picture to be inserted next, after a selected picture in the inserted elementary data stream by the following equation:

$$\text{next\_vbv\_delay} = \text{vbv\_delay\_}(\text{image\_size}/\text{bitrate}) + \Delta DTS$$

wherein vbv_delay represents VBV delay of the certain picture of the inserted elementary data stream, image size represents an image_size of the selected picture and ΔDTS represents an interval of Decode Time Stamp; and wherein the controller inserts a stuffing byte corresponding to a data amount that the bit occupancy exceeds the virtual buffer along with the selected picture when the bit occupancy of the picture to be inserted next, after the selected picture exceeds the virtual buffer.

45. The apparatus according to claim 35, wherein the inserted elementary data stream includes at least one intra-coded picture.

46. The apparatus according to claim 45, wherein the at least one intra-coded picture is a black picture.

47. The apparatus according to claim 45, wherein the inserted elementary data stream includes a number of repeat pictures following the intra-coded picture, the repeat picture repeatedly displaying a previously displayed picture.

48. The apparatus according to claim 47, wherein the controller inserts the number of repeat pictures until the last bit occupancy of the inserted elementary data stream in the virtual buffer exceeds the bit occupancy in the virtual buffer at the arbitrary splice point of the second elementary data stream, and then to insert a pseudo data into the spliced elementary data stream.

49. The apparatus according to claim 35, wherein the inserted elementary data stream includes a number of repeat pictures, the repeat picture repeatedly displaying a previously displayed picture.

50. The apparatus according to claim 49, wherein the controller inserts the number of repeat pictures until the last bit occupancy of the inserted elementary data stream in the virtual buffer exceeds the bit occupancy in the virtual buffer at the arbitrary splice point of the second elementary data stream and then inserts a stuffing byte into the spliced elementary data stream.

51. The apparatus according to claim 42, wherein the inserted elementary data stream includes a number of repeat pictures following at least one intra-coded picture, the repeat picture repeatedly displaying a previously displayed picture.

* * * * *